Figure 1:
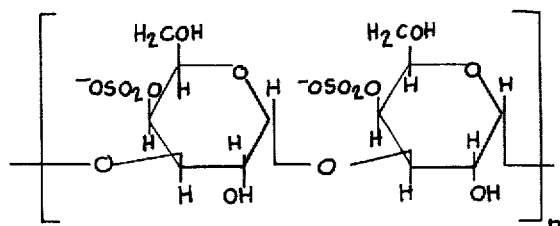

June 18, 1963   N. F. STANLEY   3,094,517
PROCESS FOR TREATING A POLYSACCHARIDE OF
SEAWEEDS OF THE GIGARTINACEAE
AND SOLIERIACEAE FAMILIES
Filed Dec. 29, 1958

INVENTOR
NORMAN F. STANLEY
BY
Kenyon & Kenyon
ATTORNEYS

United States Patent Office 3,094,517
Patented June 18, 1963

3,094,517
PROCESS FOR TREATING A POLYSACCHARIDE OF SEAWEEDS OF THE GIGARTINACEAE AND SOLIERIACEAE FAMILIES
Norman F. Stanley, Rockland, Maine, assignor to Marine Colloids, Inc., a corporation of Delaware
Filed Dec. 29, 1958, Ser. No. 783,173
12 Claims. (Cl. 260—209)

This invention relates to certain valuable discoveries in connection with the treatment of seaweeds which contain mucilaginous materials of the type found in certain marine plants of the class Rhodophyceae, and in particular of certain marine plants of the Gigartinaceae and Solieriaceae families thereof, and of the mucilaginous materials as contained in, or extracted from, said seaweeds. Among these seaweeds one may mention as typical *Chondrus crispus* (carrageen or Irish moss), *Gigartina stellata*, *Gigartina radula*, *Eucheuma striata*, and *Eucheuma cottonii*.

The novel procedures herein disclosed as a part of this invention result in the production from the aforesaid seaweeds, or from mucilaginous materials extracted therefrom, of new and hitherto unknown mucilaginous materials of a modified nature, such that these modified mucilaginous materials possess gel-forming properties in a degree not hitherto attained in mucilaginous materials as known to exist in or to be prepared from the aforesaid seaweeds by prior known methods. These procedures were originally based on the belief that the gel-forming properties characteristic of mucilaginous materials of the type found in certain marine plants of the class Rhodophyceae are due to the nature and structural arrangement of certain acid-functional groups known to be a part of the molecular structure of such mucilaginous materials, and further that the stability and reactivity of said acid-functional groups are influenced by other structural features of the molecule of mucilaginous material. It is my belief that these structural features, while not directly functional in producing gel formation, act to determine the nature and extent of the gelling phenomena induced by the aforesaid acid-functional groups. It may be that the molecular structures of the mucilaginous materials as they naturally occur in, and are ordinarily extracted from, the aforesaid seaweeds are such as to block or sterically hinder the functional groups from reacting fully to produce the gel-forming effects of which they are potentially capable. Modification of these naturally-occurring seaweed mucilages in accordance with the procedures of this invention seemingly alters their molecular structures in such a way as to relieve this blockage and/or produce a polysaccharide structure inherently more favorable to gel formation through reaction via the functional groups.

Seaweed mucilages as a class are of a polysaccharide nature. Seaweed mucilages of the type to which the practice of this invention is applicable are further characterized by containing a relatively high percentage of sulfur, in the range of about five to about thirteen percent of the dry mucilaginous material. This sulfur is known to be present therein as a monoester sulfate in which one valence of the sulfate group is esterified to the polysaccharide portion of the molecule of mucilaginous material, which the other valence is anionic in nature and thus is available for association with a cation. The monoester sulfate groups constitute acid-functional portions of the molecule of mucilaginous material. The nature of the cation or cations associated with these monoester sulfate groups is known to be a factor influencing the chemical and physical characteristics of those seaweed mucilages which contain said groups.

The gel-forming properties of the seaweed mucilages whose improvement is the object of this invention involve two distinct types of phenomena. One of these is that involving the formation of an aqueous gel composed essentially of the mucilaginous material and water. Other materials may be present and may by their presence affect certain properties of the gel, but in general are not essential to the formation of this type of gel. Gels of this type are thermally reversible, liquefying on heating and regelling on cooling. Firm gels of this type may contain from about 0.5% to several percent of mucilaginous material, the amount used depending on the type and quality of the mucilaginous material and on the gel strength desired. The tendency of the mucilaginous material to form a gel of this type is principally controlled by the cation or cations associated with the monoester sulfate groups present in the molecule of mucilaginous material.

In the case of carrageenan, the mucilaginous material of Irish moss, if the cation so associated is sodium or lithium, the carrageenan forms no gel whatsovere with water. If the cation so associated is calcium, barium, or strontium, the carrageenan will form aqueous gels of low strength, as measured by the Bloom gelometer. If the cation so associated is potassium or ammonium, the carrageenan will form aqueous gels of high strength, as measured by the Bloom gelometer. The presence of a gel-forming cation together with a non-gel-forming cation (e.g., potassium with sodium) imparts to the carrageenan an intermediate degree of aqueous gel-forming ability. On the other hand, two or more gel-forming cations (e.g., calcium and potassium) may act synergistically to impart to the carrageenan a greater aqueous gel-forming ability than would result from the presence of either cation without the other. Other factors which affect the ability of the mucilaginous material to form thermally reversible aqueous gels are the degree of polymerization of the mucilaginous material and the structural relationship of the monoester sulfate groups to the polysaccharide portion of the molecule of mucilaginous material.

The nature of the cation or cations associated with carrageenan may be controlled:

(1) Through the method of extraction employed upon the seaweed;

(2) By chemical treatment of the seaweed prior to the extraction of the carrageenan; or (3) By chemical treatment of the carrageenan subsequent to its extraction from the seaweed.

Methods for accomplishing this control of the cation content of seaweed extracts have hitherto been disclosed, are well known in the art, and are not per se claimed as a part of this invention. Such alterations in the cation content of carrageenan are fully reversible in the same sense that the altered carrageenan may be further treated to restore the cation composition of the original carrageenan, and that this restoration fully regenerates the original carrageenan. It is to be concluded, therefore, that alterations in the cation content of the carrageenan ordinarily are unattended by any change in the nature, number, or fuctionality of the monoester sulfate groups themselves. The presence of these groups and the mode whereby they are attached to the polysaccharide portion of the molecule of carrageenan thus constitute an essential and intrinsic chemical characteristic of the carrageenan in the sense that these groups are functional in bonding the cations to the polysaccharide portion of the molecule of mucilaginous material, irrespective of the cations involved.

The foregoing observations regarding the influence of cations on the aqueous gel-forming ability of the carrageenan of Irish moss, and likewise those regarding means of altering the cation content of carrageenan, also apply mutatis mutandis to mucilaginous materials occurring in certain other seaweeds. Said mucilaginous materials belong to the group characterized by a relatively high content of monoester sulfate. It does not follow, however, that all seaweed mucilages which contain much monoester sulfate invariably will be gelled by certain cations, and most notably by the potassium cation. It is seemingly the case that the structural relationship between the monoester sulfate groups and the polysaccharide portion of the molecule of mucilaginous material must be of the proper nature for aqueous gel formation to occur. Likewise, it cannot be concluded that a high monoester sulfate content is characteristic of all aqueous gel-forming seaweed mucilages. Thus agar, the mucilaginous material occurring in various seaweeds of the Gelidiaceae and Gracilariaceae families, is notable for its ability to form strong aqueous gels, although it contains very little monoester sulfate, and even this can be removed without impairing the aqueous gel-forming ability of the agar. Seemingly a different mechanism for gel formation is involved in the formation of aqueous agar gels, and this must be distinguished from the aqueous gelling mechanism involved in the case of the high monoester sulfate mucilages with which this invention is concerned.

It is an object of this invention to provide methods for improving the ability of a certain class of mucilaginous materials, of the type derived from marine plants of the class Rhodophyceae, to form thermally reversible gels with water. This improvement is effected through modification of the structural relationship of the monoester sulfate groups to the polysaccharide portion of the molecule of mucilaginous material.

The class of mucilaginous materials to which this invention applies is that comprising mucilaginous materials having monoester sulfate contents in the range of about 5% (as sulfur) to about 13% (as sulfur) of the moisture-free mucilaginous material. In particular, this invention applies to mucilaginous materials which occur in certain marine plants of the Gigartinaceae and Solieriaceae families, the carrageenan of Irish moss being an example of such a mucilaginous material.

The other type of gel-forming phenomenon, characteristic of the seaweed mucilages whose improvement is an object of this invention, and the type with which this invention is principally concerned, is that involved in the formation of a gel with milk. Gels of this type when sweetened and flavored constitute the well-known blanc mange and have long been used as an article of food representing undoubtedly the earliest usage made of the carrageenan of Irish moss. Despite their long and well-known usage, the literature discloses little evidence that these gels have ever been thoroughly investigated or clearly distinguished from the type of gel which is obtained with the mucilaginous material and water alone, notwithstanding the fact that the behavior of these mucilaginous materials toward milk is of basic importance not only with regard to their use in puddings of the blanc mange type, but also in the numerous other applications wherein they are used to stabilize dairy products, such as chocolate milk, ice cream, cheese foods, and the like.

The type of gel which these mucilaginous materials form with milk differs fundamentally from the type of gel which they form with water alone. The solids of the milk, and in particular the casein and other proteinaceous components of the milk are essential to the formation of the milk gel. That this gel formation is not a simple gelling of the mucilaginous material with the water content of the milk is strikingly shown by the small amounts, in the range of about 0.05% to about 0.50%, of the mucilaginous material required to make a firm gel with milk. The gelling of milk by the mucilaginous material seemingly involves chemical reactions of the mucilaginous material with the proteins of the milk. One such type of reaction may be that wherein the anionic monoester sulfate groups attached to the polysaccharide chains of the mucilaginous material are bonded by polyvalent cations to anionic carboxyl or ester phosphate groups attached to the polypeptide chains of the proteins. The resulting protein-cation-polysaccharide compound is thus cross-linked and is highly disposed to gel formation. The polyvalent cation involved in the cross-linkages is calcium which is furnished by the casein of the milk. This is demonstrated by the observation that the formation and strength of the milk gel is virtually independent of the cation or cations associated with the mucilaginous material. Thus a seaweed mucilage in which sodium is the cation forms a gel with milk, although it will not gel with water. Moreover, this gel will have substantially the same strength, as measured by the Bloom gelometer, as will be obtained under identical conditions using mucilaginous material containing potassium or any other cation. On the other hand, if the milk is treated, as with a cation exchange resin, to replace the calcium and other cations associated with the casein by sodium, the resulting "sodium milk" cannot ordinarily be gelled by the mucilaginous material regardless of the cation associated therewith. This is the case since at the low concentrations ordinarily required of the mucilaginous material for milk gel formation the amount of cations contributed by the mucilaginous material is small compared to that furnished by the milk. Hence, in so far as the gelling of milk by the mucilaginous material is controlled by the cations present, those furnished by the milk predominate in effecting this control. Likewise I have found that when the calcium and other cations associated with the casein of milk are substantially all replaced by potassium, the resulting "potassium milk" does not gel with the mucilaginous material.

On the other hand, a milk wherein all of the potassium normally present in natural milk has been replaced by sodium, leaving the calcium content unchanged, is gelled by the mucilaginous material, but the resultant gel is weaker than one prepared from natural milk which contains both calcium and potassium. It thus seems that the potassium acts synergistically with the calcium to yield a stronger gel than that obtained with calcium in the absence of potassium.

While the foregoing explanation of the mechanism involved in the gelling of milk by mucilaginous materials of the high monoester sulfate type is plausible and is believed by me to be true, other mechanisms are certainly conceivable, and for this reason I do not wish that what I claim as my invention, as it applies to milk gels and their formation, shall be construed as limited to milk gels formed by the said mechanism.

The gelling effect which the mucilaginous material exerts on milk may be evaluated in terms of the strength, as measured by the Bloom gelometer, of a gel prepared from the mucilaginous material and milk under certain standard conditions. Such a measurement I have found to be quite reproducible and accordingly have adopted it as an index of milk reactivity whereby various preparations of mucilaginous material may be rated with respect to their gelling effect on milk. This index of gelling ability is hereinafter referred to as "milk reactivity."

The technique whereby I determine the aforesaid milk reactivity index is essentially as follows: A dispersion containing 0.154% of the dried, pulverized, mucilaginous material is prepared in fresh homogenized whole milk. Dissolution of the mucilaginous material is effected by heating this dispersion to boiling. The resulting mucilage-milk sol is then cooled to 10° C., whereupon it sets to a gel. This gel is aged for two hours at 10°. It is then tested at 10° by means of a Bloom gelometer equipped with a plunger of 1 inch diameter. The strength of the gel is measured as the weight in grams required to force this plunger to a depth of 4 mm. into the gel when the weight is applied to the plunger at the rate of 40 grams per second. This strength of the milk gel, prepared from the mucilaginous material according to the above standard procedure, I define as the milk reactivity of the mucilaginous material.

The milk reactivity of different preparations of carrageenan extracted from Irish moss by hitherto known methods may vary somewhat but usually falls within a range of about 20 to about 70 grams. Mucilaginous materials of high monoester sulfate content from such species of marine plants, other than Irish moss, as I have so far investigated show milk reactivities which for some species are of the same order as that of the carrageenan of Irish moss. As examples of such species I can cite *Gigartina stellata* and the Eucheuma species harvested on the coast of southeast Africa and known to the trade by such names as Zanzibar weed, thick type *Gracilaria* and *Eucheuma cottonii*. For other species the milk reactivities of the mucilaginous materials extracted therefrom are lower than that of the carrageenan of Irish moss. As examples of such species I can cite *Gigartina radula, Gigartina acicularis, Furcellaria fastigiata* and the Asiatic Eucheuma species known to the trade by such names as Singapore weed, *Eucheuma spinosum*, and *Eucheuma muricatum*. In no instance, however, has a seaweed mucilage of high monoester sulfate content been found to be completely devoid of milk reactivity. It is seemingly the case that the carrageenan from Irish moss can attain a degree of milk reactivity which is as high as, or higher than, that of any other known mucilaginous material extracted from marine plants.

On the other hand, a seaweed mucilage of low monoester sulfate content, the agar extracted from various seaweeds of the Gelidiaceae and Gracilariaceae families, characteristically exhibits no measurable milk reactivity, although it is a strong water gel-forming substance. This constitutes further evidence that the milk-gelling phenomenon exhibited by certain seaweed mucilages is intimately connected with the monoester sulfate groups therein.

The variation in milk reactivity as ordinarily encountered in the carrageenan of Irish moss is largely determined by variations, of an as yet obscure nature, in the Irish moss. Such variations may be controlled to a limited degree in the course of the manufacture of the carrageenan, either by preselection and grading of the Irish moss so as to determine beforehand the quality, with respect to milk reactivity, of the carrageenan which it contains, or, alternatively, by blending various lots of carrageenan, of differing milk reactivities, to obtain a mixture possessing the desired milk reactivity. Such methods of controlling the milk reactivity fall short of being satisfactory in that they restrict the manufacturer of seaweed mucilages to the production of mucillaginous materials limited to the range of milk reactivity ordinarily encountered in the mucilaginous material as it exists in the seaweed, which range, as aforementioned, is relatively low.

Furthermore, this property of milk reactivity, as characteristic of a particular lot of seaweed mucilage, is one which, once established during the biochemical synthesis of the mucilaginous material in the course of the growth and development of the seaweed, is thereafter extraordinarily resistant to alteration. As aforementioned, the milk reactivity is substantially independent of the nature of the cation or cations associated with the mucilaginous material. A decrease in milk reactivity may be achieved by depolymerization of the mucilaginous material, but such is its resistance to change in this manner that the mucilaginous material may be subjected to a relatively severe depolymerization with minor effect on its milk reactivity. Upon further depolymerization the milk reactivity undergoes a sudden decrease and, in fact, is quickly destroyed entirely. Attainment of this stage corresponds to a very extensive depolymerization and to destruction of the mucilaginous material with respect to its useful viscosity-imparting and aqueous gel-forming properties. Furthermore, a statistical study of numerous lots of carrageenan of various milk reactivities and relative degrees of polymerization, as estimated viscometrically, has disclosed that there is no more than a slight positive correlation between milk reactivity and degree of polymerization. Thus the milk reactivity of mucilaginous material of the type found in Irish moss and certain other marine plants of the class Rhodophyceae is substantially independent of the degree of polymerization of said mucilaginous material within the range of degree of polymerization wherein the mucilaginous material retains in significant degree its viscosity-imparting and aqueous gel-forming properties.

It is a principal object of this invention to provide methods for increasing the milk reactivity of a certain class of mucilaginous materials, of the type derived from marine plants of the class Rhodophyceae. The class of mucilaginous materials to which this invention applies is that comprising mucilaginous materials having monoester sulfate contents, in the range of about 5% (as sulfur) to about 13% (as sulfur) of the moisture-free mucilaginous material. In particular, this invention applies to mucilaginous materials which occur in certain marine plants of the Gigartinaceae and Solieriaceae families. The carrageenan of Irish moss is an example of such a mucilaginous material.

My experimental work has indicated the rationale of the milk reactivity of mucilaginous materials of the high monoestersulfate type, found in Irish moss and certain other marine plants of the class Rhodophyceae, to be that the monoester sulfate groups in the molecule of mucilaginous material are functional in bonding the mucilaginous material to the proteinaceous components of milk whereby a gel-forming compound is produced, and that the milk reactivity of said mucilaginous material may be controlled and increased through an alteration of the relationship of the monoester sulfate groups to the polysaccharide portion of the molecule of mucilaginous material from that normally occurring in the molecule to a configuration wherein the monoester sulfate groups are disposed to react with the proteinaceous components of the milk in a manner more favorable to the formation of a gel-forming compound. This alteration consists of structural changes in the polysaccharide portion of the molecule, which changes may be such as to relieve a blockage or steric hinderance of the acid function of the monoester sulfate groups and thus permit them to exercise their full potentiality for association with cations and thereby with proteinaceous substances as in milk. Alternatively, or concomitantly, these changes may be such as to produce a polysaccharide structure, possibly by intermolecular association or crosslinkage, which is inherently more susceptible to gel formation through reaction via the acid-functional groups. These changes I have found to involve an extensive increase in the number of 3,6-anhydrogalactose residues present in the molecule of mucilaginous material. This effect may or may not be accompanied by an extensive decrease in the number of monoester sulfate groups present in the molecule.

Methods hitherto employed in the investigation of the carrageenan of Irish moss have demonstrated that the monoester sulfate groups present in the carrageenan are of a highly resistant nature and have not succeeded in effecting any extensive removal of said monoester sulfate groups from the carrageenan without severely depolymerizing the polysaccharide portion of the molecule of carrageenan. My investigations, however, have shown that at least a partial removal of monoester sulfate groups can be achieved through alkaline hydrolysis and saponification of carrageenan or other seaweed mucilages containing said groups by means of an alkali, such as barium hydroxide or strontium hydroxide which is capable of removing the liberated sulfuric acid from the reaction by fixing it in the form of the highly insoluble barium sulfate or strontium sulfate. As much as 70% of the sulfur present in carrageenan can be removed in this manner without severely depolymerizing the polysaccharide portion of the molecule. As will subsequently be shown, it is seemingly the case that any alkali can effect a loosening or detachment of the carbon-oxygen-sulfur bond attaching the monoester sulfate to the polysaccharide portion of the carrageenan molecule, but that this reaction is completely reversible so that no extensive removal of the monoester sulfate groups can occur except in the presence of a reagent such as barium hydroxide, which is capable of removing the liberated sulfuric acid from the reaction scene.

The resistance of the milk reactivity of the mucilaginous materials which are the subject of this invention to alteration by hitherto known methods parallels the resistance of the monoester sulfate groups to removal from said mucilaginous materials. I have discovered that where the monoester sulfate groups can be successfully attacked, as by the method of alkaline hydrolysis hereinabove described, the milk reactivity of the mucilaginous material is also affected. One might reasonably expect that if the number of monoester sulfate groups in the molecule of mucilaginous material is decreased, as is the case by the above method, the sites for cross-linkage with the casein of the milk are thereby reduced and a reduction of the milk reactivity of the so-treated mucilaginous material would result. The actual effect which the aforesaid treatment achieves, however, is, surprisingly, that of a substantial increase in milk reactivity. This anomaly has led to the hypothesis that decrease of the number of monoester sulfate groups in the molecule of mucilaginous material within the range achieved in my investigations is, at most, of secondary significance in the control of milk reactivity, and that the primary effect, with respect to milk reactivity, of the alkaline hydrolysis is one of an intramolecular rearrangement of the remaining monoester sulfate groups into a configuration conducive to a net increase in the milk reactivity of the mucilaginous material.

I have further discovered, in confirmation of the hypothesis alluded to in the preceding paragraph, that an alteration of the milk reactivity of the mucilaginous materials which are the subject of this invention can be achieved with little or no change in the monoester sulfate contents thereof. To achieve this result I employ an alkali treatment similar to that hereinabove mentioned, but instead of barium hydroxide I use an alkali which does not remove the sulfur of the mucilaginous material as an insoluble sulfate. A mild alkali, such as calcium hydroxide, is to be preferred to a strong alkali such as sodium hydroxide, as with the amount of alkali and at the temperatures which are optimal for the improvement of milk reactivity by this method the use of a strong alkali effects an undesirably severe depolymerization of the mucilaginous material.

Recent discoveries in regard to the molecular structure of the carrageenan of Irish moss lend credence to my theory hereinabove set forth. Studies of this seaweed mucilage indicate that it is a mixture consisting predominantly of two polysaccharides known as lambda-carrageenan and kappa-carrageenan which are present in the unfractionated carrageenan in about equal amounts. A distinguishing difference between these two polysaccharides is that kappa-carrageenan is precipitated or gelled by potassium ions, whereas lambda-carrageenan lacks this so-called "potassium sensitivity." This difference in behavior toward potassium ions is employed for the fractionation of carrageenan into the aforesaid lambda and kappa constituents. The aqueous gel-forming properties of unfractionated carrageenan, as ordinarily extracted from Irish moss, appear to be due to the kappa fraction thereof; likewise, evidence has been presented (Smith, Canadian Journal of Technology, vol. 31, pp. 209–212 (1953)) that the milk reactivity of said unfractionated carrageenan is due to its kappa fraction.

Although the molecular structure of lambda-carrageenan has not as yet been completely elucidated, it is believed to consist largely of linear chains of D-galactose residues joined by 1,3'-glycosidic linkages and with a monoester sulfate group attached to carbon 4 of each galactose. This feature of the structure of lambda-carrageenan is shown as a structural formula in FIGURE 1.

Figure 2:
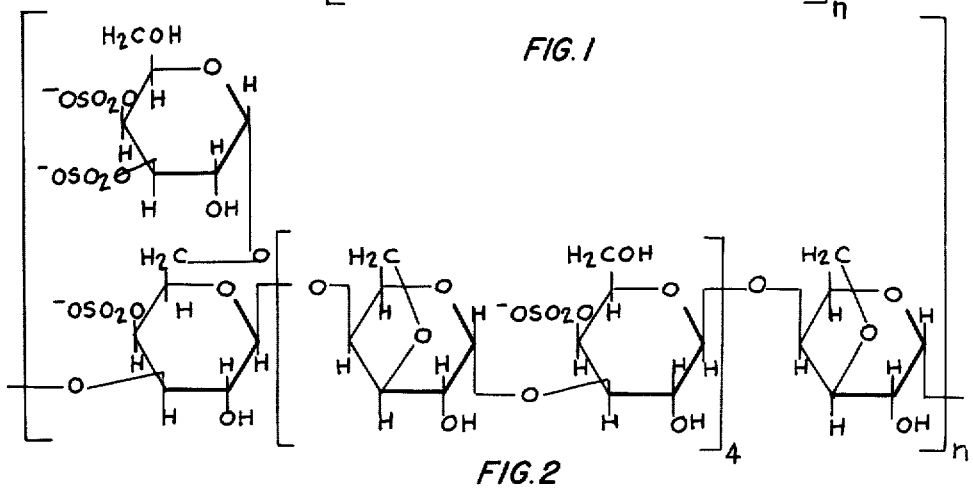

The other constituent of Irish moss mucilage, kappa-carrageenan, has been more thoroughly characterized than has lambda-carrageenan. The molecule of kappa-carrageenan is believed to consist of a main linear chain made up of alternate D- galactose and 3,6-anhydro-D-galactose residues. Each D-galactose residue carries a monoester sulfate group on carbon 4 and is beta-1,4'-glycosidically linked to an adjacent 3,6-anhydro-D-galactose residue. Each 3,6-anhydro-D-galactose residue is alpha-1,3'- glycosidically linked to an adjacent D-galactose residue and is unsulfated. A short side chain, believed to consist of a single D-galactose residue with monoester sulfate groups attached at carbons 3 and 4, is 1,6'-glycosidically linked to each fifth D-galactose unit of the main chain. The presently accepted structural formula of kappa-carrageenan is as shown in FIGURE 2.

On the basis of the above structures presently accepted for lambda- and kappa-carrageenan, their compositions in terms of percentages of sulfate groups and hexose residues composing said structures have been calculated. In the course of my investigations as to the nature of the structural changes effected in carrageenan by the practice of my invention, these individual fractions of carrageenan were isolated and separately subjected to alkaline hydrolysis in accordance with the practice of this invention. Analytical data on these fractions, and on unfractionated carrageenan before and after alkaline hydrolysis, are presented in Table 1 in comparison with the aforesaid theoretical values calculated from the above structural formulas:

TABLE 1

| Material | 3,6 anhydro galactose, percent [1] | $SO_4$, percent [1] | Milk reactivity [2] | Aqueous gel strength [3] | Viscosity [4] |
| --- | --- | --- | --- | --- | --- |
| Na λ-carrageenate (theoretical) | 0 | 36.4 | | | |
| Na k-carrageenate (theoretical) | 33.7 | 27.9 | | | |
| Na λ-carrageenate (prepared by fractionation) | 2.91 | 36.49 | ([5]) | ([6]) | 45 |
| Na salt of Ca(OH)$_2$-treated Na λ-carrageenate | 14.97 | 37.85 | ([7]) | 4.6 | 6 |
| Na k-carrageenate (prepared by fractionation) | 27.69 | 25.81 | 40.1 | 185.0 | 9 |
| Na salt of Ca(OH)$_2$-treated Na k-carrageenate | 27.70 | 28.06 | 68.0 | 339.7 | 5 |
| Na carrageenate (unfractionated) | 17.86 | 31.87 | 45.7 | 239.7 | 106 |
| Na salt of Ca(OH)$_2$ treated unfractionated Na carrageenate | 26.66 | 28.54 | 122.6 | 290.2 | 19 |
| Na salt of Ba(OH)$_2$-treated Na λ-carrageenate | 21.84 | 31.00 | ([5]) | | 6 |

[1] Percent based on moisture-free material.
[2] Strength of gel containing 0.154% material (not corrected for moisture content) in whole milk, in grams at 10° C. as measured by a Bloom gelometer equipped with a 1″ diameter plunger.
[3] Strength of aqueous gel, containing 1.5% material (not corrected for moisture content) plus KCl equivalent to twice the monoester sulfate of the material, in grams at 10° C. as measured by a Bloom gelometer equipped with a 0.5″ diameter plunger.
[4] Viscosity of 0.5% aqueous solution of material (not corrected for moisture content), in centipoises at 25° C. as measured by a MacMichael viscosimeter.
[5] Gel too weak to measure.
[6] Completely fluid.
[7] Trace of gel.

The analytical data given above for the sodium lambda- and kappa-carrageenates differ somewhat from the theoretical values therefor, but are close to results found by other investigations of carrageenan fractions. (Smith, O'Neill and Perlin, Canadian Journal of Chemistry, vol. 33, pp. 1352–1360 (1955); O'Neill, Journal of the American Chemical Society, vol. 77, pp. 6324–6 (1955)). Some divergence from theoretical values is to be expected due to the practical difficulty of obtaining completely separated fractions.

Comparsion of the above analytical data for the carrageenan fractions, as well as for the unfractionated carrageenan, before and after alkaline hydrolysis reveals that the lambda fraction undergoes a pronounced change in chemical composition on said hydrolysis, this change consisting in the formation therein of a large percentage of 3,6-anhydrogalactose residues, a structural feature normally associated with kappa-carrageenan and not present in normal lambda-carrageenan. One cannot conclude, however, that alkaline hydrolysis has converted any substantial portion of the lambda-carrageenan to kappa-carrageenan. Such a conversion should result in a marked decrease in monoester sulfate content. However, when the hydrolysis was conducted with calcium hydroxide no such decrease was found, sulfate analyses indicating first the ratio of monoester sulfate groups to galactose plus anhydrosugar residues was very close to 100% for both the untreated lambda-carrageenan and the product obtained from it on hydrolysis with calcium hydroxide. On the other hand, hydrolysis with barium hydroxide, a reagent which I have found will remove monoester sulfate groups when employed according to the practice of this invention, resulted in a decrease in sulfate content to 85% of that of the untreated lambda-carrageenan. Furthermore, no substantial development of either aqueous gel-forming ability or milk reactivity typical of kappa-carrageenan was obtained by hydrolysis of lambda- carrageenan with either calcium hydroxide or barium hydroxide. One must conclude, therefore, that alkaline hydrolysis according to the practice of this invention when applied to lambda-carrageenan results in the production of a new and hitherto unknown polysaccharide, said polysaccharide containing substantial number of anhydrosugar residues, believed to be of the 3,6-anhydro type, and either substantially the same ratio monoester sulfate groups to galactose residues plus anhydrosugar residues as occur in the precursive lambda-carrageenan, on a substantially smaller ratio thereof, the latter case occurring when the alkali employed to effect the hydrolysis is one capable of irreversibly splitting off monoester sulfate groups from the polysaccharide chain. For the purpose of characterization I consider that this new polysaccharide has substantially the same ratio of monoester sulfate groups to galactose residues plus anhydrosugar residues as that of lambda-carrageenan when analysis indicates a ratio falling within the range of 90% to 110%, and that a ratio of less than 90% indicates that an appreciable amount of monoester sulfate has been removed from the polysaccharide chain. My investigations indicate that this new polysaccharide derived from lambda-carrageenan may have a ratio of monoester sulfate groups to galactose plus anhydrosugar residues as low as 30%. In its lack of gel-forming properties, this new polysaccharide per se closely resembles lambda-carrageenan. Further evidence as to the nature of this new polysaccharide is furnished by its infrared absorption spectrum. This shows little change from lambda-carrageenan in a peak at 1230 cm.$^{-1}$, which has been correlated to the sulfate group and appearance of a strong peak at 935 cm.$^{-1}$ which has been correlated to the 3,6-anhydro ring. Changes are also observed in the fine structure of a broad peak in the 1000–1100 cm.$^{-1}$ region which I believe to be associated with the glycosidic carbon-oxygen-carbon bonds of the polysaccharide structure. The complex nature of this peak may be interpreted as indicating the presence of three, or possibly more, different types of glycosidic bond, the differences apparently being accountable to the effect of neighboring structures on said glycosidic bonds. The structure of lambda-carrageenan as shown in Formula 1 does not indicate any such differences in the glycosidic bonds; however, as previously stated, this polysaccharide has not as yet been completely characterized and the possibility of more than one type of glycosidic bond and/or ester sulfate structure cannot be precluded.

The decrease in viscosity observed on the aforesaid alkaline hydrolysis of lambda-carrageenan indicates that the new polysaccharide obtained thereby is less highly polymerized than its precursor. This has been confirmed by ultracentrifugation studies and by determination of reducing end groups. The latter determination indicates that the new polysaccharide has an average molecular weight, which is about one-third that of the precursive lambda-carrageenan.

Presently available information is insufficient to permit complete elucidation of the structure of the aforesaid new polysaccharide nor of the mechanism of its formation from lambda-carrageenan. However, it is possible to offer an hypothesis as to said structure and mechanism based on known properties of carbohydrate sulfates. Such an hypothesis must account for the extensive formation of 3,6-anhydro rings on alkaline hydrolysis of lambda-carrageenan. It is known that anhydro rings are formed by the alkaline hydrolysis of carbohydrates containing sulfate and hydroxyl groups in certain configurations relative to each other (Percival, Quarterly Reviews (London), vol. 3, pp. 369–384 (1949)). One such configuration leading to anhydro ring formation is that wherein the carbohydrate contains a hydroxyl group on a carbon atom adjacent to a carbon atom carrying a sulfate group in the trans-configuration relative to the hydroxyl. Mild treatment of such a carbohydrate sulfate with alkali results in cleavage of the sulfate with Walden inversion of the carbon atom which carried the sulfate and formation of an ethylene oxide ring between the carbon atoms involved. Such an ethylene oxide ring, if properly situated, may further rearrange into a 3,6-anhydro ring. Another configuration, and one leading directly to 3,6-anhydro ring formation, is that wherein the carbohydrate is sulfated at carbon 6 and has a free hydroxyl group at carbon 3. In this case mild alkaline hydrolysis results in cleavage of the sulfate and formation of a 3,6-anhydro ring.

Figure 3:
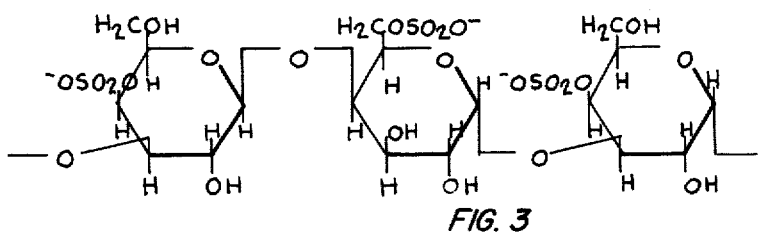
Figure 4:
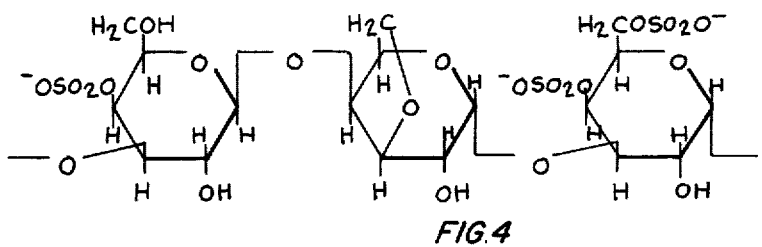

Neither of the above conditions for anhydro ring formation appears to be present in lambda-carrageenan as conventionally represented by the structure of FIGURE 1. Furthermore, the practice of my invention has been found to require alkaline hydrolysis under relatively severe conditions, which may be taken to indicate that the lambda-carrageenan structure is not inherently favorable for the chemical changes claimed as a part of my invention. Nevertheless, it is evident that said chemical changes do involve anhydro ring formation, and hence it is a reasonable conjecture that the initial action of the alkali on the resistant lambda-carrageenan structure may be one of rearrangement of said structure into a configuration which can lead to anhydro ring formation. Such a postulated rearrangement may be one wherein a sulfate group migrates from carbon 4 to carbon 6, while the 1,3′-glycosidic linkage migrates to the 4′ position vacated by the sulfate, as shown by reference to FIGURES 1 and 3. The resulting structure (FIGURE 3) then is favorable for the formation of a 3,6-anhydro ring by cleavage of the sulfate on carbon 6. Since the product formed by alkaline hydrolysis of lambda-carrageenan contains substantially the same amount of monoester sulfate as the precursive larbda-carrageenan itself, it must be assumed that the sulfate cleaved from carbon 6 further migrates to some other available position, possibly to carbon 2 of the galactose residue involved or to carbon 2 or carbon 6 of an adjacent galactose residue (FIGURE 4).

It can be seen that the postulated structure (FIGURE 4) of alkali-modified lambda-carrageenan has certain structural features characteristic of kappa-carrageenan (FIGURE 2), notably 3,6-anhydro-D-galactopyranose residues and beta-1,4'-glycosidic linkages attached thereto. Additional evidence for the presence of these structures in alkali-modified lambda-carrageenan is found on comparison of the infrared spectra of lambda-carrageenan, alkali-modified lambda-carrageenan, and kappa-carrageenan. The salient features of these spectra are given in Table 2.

as a contaminant in said preparation of kappa-carrageenan.

Evidence has been cited (Bayley, supra) that normal lambda- and kappa-carrageenans as they naturally occur in unfractionated carrageenan are not present therein as a simple mixture, but coexist in a definite structural relationship to one another and thus may be said to form a single compound, though evidently a loosely bonded one. It is my hypothesis that the alkaline hydrolysis of lambda-carrageenan produces a new polysaccharide which is likewise capable of associating with kappa-carrageenan to form an addition compound which is not only more firmly

TABLE 2

| Sample | Wave number, cm.$^{-1}$ | | | |
| --- | --- | --- | --- | --- |
| | 935 | 1015 | 1070 | 1230 |
| Lambda | Trace of peak | Peak | Small peak | Large peak. |
| Modified lambda | Intermediate peak | Peak obscured | Large peak | Do. |
| Kappa | Large peak | do | do | Intermediate peak. |

The peaks at 935 cm.$^{-1}$ and 1230 cm.$^{-1}$ have been assigned to the 3,6-anhydro ring and monoester sulfate, respectively, as aforesaid, and are seen to agree well with the analytical determinations of these moieties cited in Table 1. The peaks at 1015 cm.$^{-1}$ and 1070 cm.$^{-1}$ occur in the band assigned to glycosidic carbon-oxygen-carbon linkages, and if the peak at 1015 cm.$^{-1}$ is assigned to the alpha-1,3'-glycosidic linkage and that at 1070 cm.$^{-1}$ to the beta-1,4'-glycosidic linkage, then the observed peaks agree with the known presence of the latter linkage in kappa-carrageenan and its postulated appearance in alkali-modified lambda-carrageenan by rearrangement of a portion of the alpha-1,3'-glycosidic linkages present in the precursive lambda-carrageenan.

Alkali-modified lambda-carrageenan differs from kappa-carrageenan in that it may have additional monoester sulfate groups, attached either to the 3,6-anhydro-D-galactopyranose residues or to adjacent D-galactopyranose residues; also in preparations of this new polysaccharide so far examined, the number of 3,6-anhydro structures found is substantially less than is found in kappa-carrageenan. It is, therefore, indicated that the 3,6-anhydro-D-galactopyranose residues in said new polysaccharide are randomly distributed throughout the polysaccharide chain, rather than in the regular alternation with D-galactopyranose residues found in kappa-carrageenan. The regular interspersal of sulfated residues with non-sulfated residues characteristic of kappa-carrageenan has been suggested as an explanation of the specific tendency of kappa-carrageenan to form gels in the presence of certain cations, notably potassium (Bayley, Biochim et. Biophys, Acta, vol. 17, pp. 194–205 (1955)). An absence of the same regular spacing of monoester sulfate groups, plus steric hindrance due to the additional monoester sulfate groups, in alkali-modified lambda-carrageenan may well account for its failure to possess the gel-forming properties characteristic of kappa-carrageenan.

In contrast to the pronounced chemical changes observed in lambda-carrageenan an alkaline hydrolysis in accordance with the practice of this invention, no evidence of any extensive chemical change is found on like treatment of kappa-carrageenan. This is shown by the analytical data of Table 1, and by the close similarity of the infrared absorption spectra of normal and alkali-modified kappa-carrageenan. Although an increase in both milk reactivity and aqueous gel-forming ability was observed on alkali treatment of the preparation of kappa-carrageenan studied here, the abovesaid chemical evidence has led me to believe that this is due to an association or interaction of the essentially unchanged kappa-carrageenan with alkali-modified lambda-carrageenan arising from a small percentage of lambda-carrageenan present bonded than that consisting of normal lambda- and kappa-carrageenans, but also possesses greatly enhanced milk reactivity and aqueous gel-forming ability. This compound, in the case of the carrageenan of Irish moss, or compounds analogous thereto in the case of other seaweed mucilages found to be responsive to improvement of their gelling properties through the practice of this invention I believe constitute the essential ingredient of the improved seaweed mucilages I wish to claim as parts of my invention.

Evidence that the participation of both the lambda- and kappa-fractions of carrageenan is necessary to obtain a high degree of improvement in milk reactivity through alkaline hydrolysis in accordance with the practice of this invention is afforded by the substantial increase in milk reactivity cited in Table 1 for the alkali treatment of unfractionated sodium carrageenate as compared with the smaller increase found on alkali treatment of a sodium kappa-carrageenate preparation from which most of the lambda fraction had been removed and with the complete absence of milk reactivity found on alkali treatment of a sodium lambda-carrageenate preparation from which most of the kappa fraction had been removed.

While the foregoing description of the chemical changes involved in and the compounds formed by the alkaline hydrolysis of carrageenan and other seaweed mucilages in accordance with the practice of this invention is plausible in the light of presently available evidence and is believed by me to be essentially correct, the possibility is recognized of there being other reaction mechanisms and compounds formed thereby which can conceivably be postulated to fit the presently available evidence, and for this reason I do not wish that what I claim as my invention, in so far as it applies to the alkaline hydrolysis of seaweed mucilages and to the compounds formed thereby, shall be construed as limited to the particular reaction mechanism hereinabove set forth and the particular compounds hereinabove indicated as being produced thereby. Rather, what I wish to claim in this respect are chemical processes and compounds of such a nature and possessed of such properties as I have established and herein set forth.

The following techniques may be employed in the practice of this invention, it being understood that the description given herewith of said techniques is intended to be illustrative rather than limiting.

The mucilaginous material to be treated is taken in the form of an aqueous solution containing, as a matter of convenience, one percent or more of mucilaginous material. Such a solution may be one prepared from an extract of the mucilaginous material produced by any previous process hitherto employed for the manufacture of mucilaginous extracts from Irish moss or other seaweeds of the class Rhodophyceae. Alternatively, the solution may be a syrup of mucilaginous material obtained by filtration or other means of separation from the seaweed in accordance with prior known methods for the separation of the mucilaginous material from the insoluble constituents of the seaweed. Alternatively, as a feature of preferred practice of this invention the treatment may be applied to an aqueous mass of the seaweed itself wherein the mucilaginous material has not been separated from the insoluble constituents of the seaweed. This latter technique is advantageous in that it permits the treatment of the mucilaginous material to improve its gel-forming properties to be carried out simultaneously with the digestion of the seaweed to bring the mucilaginous material into solution whence it can be recovered by filtration or other conventional means.

The alkali employed in the preferred practice of this invention is calcium hydroxide, which is to be preferred from the standpoints of its effectiveness in promoting the desired improvement in milk reactivity of the mucilaginous material, its mildness with respect to degradative attack on the polysaccharide chain of the molecule of the mucilaginous material, its low solubility and its low cost. The amount of calcium hydroxide employed may be varied somewhat, with the most effective amount being from 50% to 125% of the mucilaginous material present, though lesser amounts down to about 10% may be used. In general, the larger amount of calcium hydroxide produces the greater increase in milk reactivity of the mucilaginous material. While these amounts of calcium hydroxide are in considerable excess of that soluble in the amount of water present, it is seemingly, the case, nevertheless, that the excess calcium hydroxide in its solid state is an active agent in the improvement of the milk reactivity of the mucilaginous material. The calcium hydroxide is consumed, in the amount of about 10% of the weight of mucilaginous material present, by reaction with the mucilaginous material to replace the cations associated with the mucilaginous material by calcium. An excess calcium hydroxide, which may amount to 40% to 115% of the weight of the mucilaginous material, seemingly acts catalytically in the sense that while its presence is necessary to the achievement of a great improvement in the milk reactivity of the mucilaginous material, it is not consumed thereby. Thus the excess calcium hydroxide remains unchanged at the end of the treatment, and, being in the form of solid particles of high density, may be separated from the aqueous mass of digested seaweed by decantation, centrifugation, or other means, and largely recovered for reuse.

Alkalies other than calcium hydroxide may be employed in the practice of this invention and thus are understood to come within the scope of this invention, for it is seemingly the rationale of this invention that an alkaline hydrolysis is employed to loosen the bond between the monoester sulfate groups and the polysaccharide chains of the mucilaginous material whereby said monoester sulfate groups may either be split off entirely from the molecule of the mucilaginous material or be enabled to re-esterify in new positions on the polysaccharide chains of the molecule of mucilaginous material. The alkali employed need not be sparingly soluble nor be present in the solid form to be effective in the practice of this invention, and mild alkalies which are highly soluble, such as sodium carbonate or trisodium phosphate can be used.

The conversion of the mucilaginous material possessing a normal degree of milk reactivity, that is, capable of forming with milk a gel whose strength lies ordinarily within the range from unmeasurably low strength up to a strength of 70 grams as measured by my aforementioned standard procedure, into mucilaginous material of increased milk reactivity is accomplished by heating the aqueous mixture containing mucilaginous material and alkali prepared in accordance with the conditions hereinabove described. The temperature ordinarily employed ranges from about 80° C. to about 150° C., temperatures between 90° C. and 130° C. being preferable. In general, the increase in milk reactivity will be greater when the higher temperatures within this range are employed. To attain these higher temperatures requires that the heating be carried out at greater than atmospheric pressure, and accordingly an autoclave or pressure cooker must be used. On the other hand, heating at 90° C. to 100° C. can be done at atmospheric pressure, and from the standpoint of simplicity and initial cost of equipment this temperature range is to be preferred.

The period of treatment may be varied. In general, the increase in milk reactivity will be greater if the treatment is prolonged. A period of about three to six hours may be considered optimal.

Following the treatment the greater part of the excess calcium hydroxide may be separated, as aforementioned, if it is desired to recover it for reuse. Filter aid is then added to the mixture and filtration accomplished by any suitable type of equipment of which many are well known, e.g., a filter press, rotary filter, or the like. It is preferable that this filtration be carried out on the mixture while it is hot, as it is a characteristic of the mucilaginous material after being subjected to the foregoing treatment wtih calcium hydroxide that its aqueous solution is highly fluid when hot so that it can be filtered very readily in this state. It is also preferable that the filtration be carried out prior to neutralization of the alkaline mixture so as to remove any remaining solid calcium hydroxide and thereby to minimize the amount of acid subsequently required for neutralization, and, further, to take full advantage of the greater stability of the mucilaginous material when alkaline to depolymerization by heat.

The filtered alkaline syrup of mucilaginous material is then neutralized, preferably by addition of a mineral acid such as sulfuric acid or hydrochloric acid, although any other suitable acid may be used.

The foregoing steps accomplish the treatment of the mucilaginous material, to improve its milk reactivity, and the recovery of the treated mucilaginous material. For commercial marketing the recovered syrup can be further treated, according to conventional practice, so as to produce the mucilaginous material in dry form. For this one may employ such operations as drum or spray drying, coagulation with alcohol, etc., as may be regarded as convenient.

The following examples offer specific illustrations of the practice of this invention and the nature of the mucilaginous materials obtained thereby. It is to be understood that they are intended only to illustrate and not to limit the scope of this invention.

*Example 1*

Portions of a filtered extract of Irish moss, said extract containing 1.66% of mucilaginous material, were heated with calcium hydroxide in the amount of 120% of the weight of mucilaginous material in the portion taken. The heating was maintained for six hours at various temperatures, as shown in Table 3. Each portion after heating was filtered to remove excess calcium hydroxide. The filtrates were neutralized with hydrochloric acid and the mucilaginous materials precipitated therefrom by the addition of isopropyl alcohol. After further dehydration with isopropyl alcohol the precipitated mucilaginous materials were dried at 65° C. The dried mucilaginous materials were tested for their milk reactivity, aqueous gel-forming power, and viscosity in aqueous solution.

For comparison, other portions from the same lot of filtered Irish moss extract were heated under conditions similar to the foregoing, except that no calcium hydroxide or other alkali was present. After heating, these portions were worked up as in the foregoing procedure to yield the dried mucilaginous materials therefrom, and these were also tested.

A specimen of the mucilaginous material precursive to the above preparations of this example was prepared by precipitating with isopropyl alcohol a portion of the original filtered extract of Irish moss, omitting both the calcium hydroxide and the six-hour heating period. The precipitate was further dehydrated with isopropyl alcohol and dried at 65° C.

Data on all of the preparations of this example are given in Table 3.

ion so associated with the alkali-treated products cited in this example is calcuim, which is not a strongly gel-forming cation with respect to the mucilaginous material of Irish moss. Thus the aqueous gel strengths shown in Table 3 could have been greatly increased by the introduction of other cations, notably potassium. Instances of the aqueous gel strengths thus attainable will be cited in a subsequent example.

Moreover, it is to be observed that the results presented in this example, having been obtained by treatment of a filtered extract of mucilaginous material entirely separated from the less soluble constituents of the Irish moss,

TABLE 3

| Temperature of treatment, ° C. | With 120% Ca(OH)₂ | | | | Without alkali | | | |
|---|---|---|---|---|---|---|---|---|
| | Treatment pH [1] | Milk reactivity [2] | Aqueous gel strength [3] | Viscosity [4] | Treatment pH [1] | Milk reactivity [2] | Aqueous gel strength [3] | Viscosity [4] |
| 99 | 12.0 | 105.0 | 19.0 | 485 | 7.0 | 41.0 | ([6]) | 485 |
| 108 | 12.1 | 140.9 | 40.1 | 485 | 6.8 | 40.4 | ([6]) | 292 |
| 115 | 12.0 | 139.4 | 41.2 | 434 | 6.7 | 32.6 | ([6]) | 109 |
| 121 | 12.0 | 143.6 | 31.9 | 365 | 6.5 | 25.2 | ([6]) | 40 |
| 126 | 11.9 | 156.5 | 32.5 | 270 | 6.2 | ([5]) | ([6]) | 9 |
| Precursive material (from untreated extract) | | | | | | 41.0 | ([6]) | 856 |

[1] pH of mixture after heating and before filtration and neutralization.
[2] Strength of gel, containing 0.154% mucilaginous material in whole milk, in grams at 10° C. as measured by a Bloom gelometer equipped with a 1-inch diameter plunger.
[3] Strength of gel, containing 1.5% mucilaginous material in water, in grams at 10° C. as measured by a Bloom gelometer equipped with a 0.5-inch diameter plunger.
[4] Viscosity of 1% aqueous solution of mucilaginous material, in centipoises at 25° C. as measured by a MacMichael viscosimeter.
[5] Soft gel, too weak to measure.
[6] The precursive material and the products prepared from it by heating without alkali contained principally sodium as a cation and hence were not water-gelling materials. The calcium salt of the precursive material would have an aqueous gel strength of about 10 grams.

Examination of the data in this table reveals that the present invention, as illustrated in this example, results in a large increase in the milk reactivity of the mucilaginous material found in Irish moss, said increase being commonly in a two-fold to four-fold ratio of the milk reactivity of the improved material over that of its precursor. Furthermore, the increase is seen to be greater when the alkali treatment is conducted at higher temperatures, even though some depolymerization of the mucilaginous material, as indicated by decreased viscosity, occurs at these higher temperatures. This illustrates the relative insensitivity of the milk reactivity to the degree of polymerization of the mucilaginous material.

Moreover, it may be seen that, as a further feature of this invention, the alkali treatment of the mucilaginous material not only improves its milk reactivity, but also enhances its potential ability to form gels with water as well over. It is seemingly the case that the rearrangement of structure brought about through the alkali treatment relocates the monoester sulfate groups in a configuration which is generally favorable for cross-linkage, whether it be that between the monoester sulfate groups and the carboxyl or ester phosphate groups of casein, as in the gelling of milk, or that between monoester sulfate groups on adjacent polysaccharide chains of the mucilaginous material, as may be involved in its gelling with water. Furthermore, it may be seen that the increase in aqueous gel strength roughly parallels the increase in milk reactivity, with a two-fold to four-fold ratio of the aqueous gel strength of the improved material to that of its precursor being found. The aqueous gel strength, however, is rather more sensitive to the degree of polymerization of the mucilaginous material than is the milk reactivity, and hence tends first to increase as the temperature of the alkali treatment is raised and then to decrease at still higher temperatures at which depolymerization of the mucilaginous material becomes considerable. Also, the aqueous gel strength depends on the cations associated with the monoester sulfate groups, whereas the cation so associated with the alkali-treated products cited demonstrate clearly that the nature of this invention consists in the modification of the normal mucilaginous material of Irish moss into a novel and hitherto unknown form of improved gel-forming properties, that this improved material is not an additional substance already present in the Irish moss, and that the practice of this invention when applied directly to the whole Irish moss does not consist merely of a more drastic extraction method aimed at extracting additional substances from the seaweed.

Moreover, a comparison of the alkali treatments with the control treatments conducted without alkali illustrates the greater stability toward depolymerization by heat of the mucilaginous material under alkaline conditions. Furthermore, it is seen that the effect of heat alone, in the absence of alkali, does not result in the improvement of the mucilaginous material which is the object of this invention.

*Example 2*

Portions of a filtered extract of Irish moss, said extract containing 1.81% of mucilaginous material, were heated with various amounts of calcium hydroxide. The temperature was maintained at 126° C. for three hours. Each portion after heating was filtered to remove excess calcium hydroxide. The filtrates were neutralized with hydrochloric acid and the mucilaginous materials precipitated therefrom by the addition of isopropyl alcohol. After further dehydration with isopropyl alcohol the precipitated mucilaginous materials were dried at 65° C.

A specimen of the mucilaginous material precursive to the above preparations of this example was prepared by precipitating with isopropyl alcohol a portion of the original filtered extract of Irish moss, omitting both the calcium hydroxide and the three-hour heating period. The precipitate was further dehydrated with isopropyl alcohol and dried at 65° C.

Data on all of the preparations of this example are given in Table 4.

TABLE 4

| Ca(OH)₂ percent of mucilaginous material | Treatment, pH [1] | Milk reactivity [2] | Aqueous gel strength [3] | Viscosity [4] | SO₄, percent [5] | Ca, percent [5] | Theoretical percent Ca for Ca carrageenate [6] | Ca, percent of theoretical |
|---|---|---|---|---|---|---|---|---|
| (7) | | 48.1 | 6.9 | 556 | 25.80 | 0.37 | 5.38 | 6.9 |
| 27.6 | 11.6 | 61.2 | 47.8 | 243 | 23.63 | 3.65 | 4.93 | 74.0 |
| 55.2 | 11.8 | 98.4 | 59.7 | 353 | 23.91 | 4.17 | 4.99 | 83.7 |
| 110.4 | 11.9 | 150.3 | 95.8 | 262 | 23.97 | 4.42 | 5.00 | 88.4 |

[1] As in Example 1.
[2] As in Example 1.
[3] As in Example 1.
[4] As in Example 1.
[5] Not corrected for moisture content of mucilaginous material.
[6] Calculated from SO₄ according to theoretical ratio of Ca/2SO₄ for a Ca galactose sulfate.
[7] Precursive material, not heated with alkali.

This example demonstrates that the degree of improvement of the gelling properties of the mucilaginous material of Irish moss can be controlled by varying the amount of calcium hydroxide employed. Moreover, it illustrates the desirability of employing a large excess of alkali in order to obtain a high degree of improvement.

A slight desulfation of the mucilaginous material is observed in this example. This phenomenon appears to be a result of the high temperature at which the alkali treatments were carried out. However, a decrease in sulfate content is not necessarily attendant upon the improvement of the mucilaginous material with respect to its gel-forming properties. As will be shown in a subsequent example, the employment of lower temperatures for the alkali treatment can effect a substantial improvement in the gelling properties of the mucilaginous material with negligible change in its sulfate content.

*Example 3*

Another portion of the filtered extract of Irish moss employed in Example 2 was heated with sodium carbonate in the amount of 276% of the weight of mucilaginous material in the solution. The temperature was maintained at 126° C. for three hours. The product obtained thereby was filtered to remove calcium carbonate formed by the reaction of some of the sodium carbonate with calcium present in the aforementioned Irish moss extract. The filtrate was at pH 10.4. It was neutralized with hydrochloric acid and the mucilaginous material precipitated therefrom by the addition of isopropyl alcohol. After further dehydration with isopropyl alcohol the precipitated mucilaginous material was dried at 65° C.

The following analytical data apply to the product obtained thereby:

Milk reactivity _____ g__ 111.6
Aqueous gel strength _____ None—fluid
Viscosity _____ cp__ 56
SO₄ _____ percent__ 22.93

These may be compared with the corresponding data cited in Example 2.

The present example demonstrates that an alkali other than calcium hydroxide may be used to improve the gelling properties of the mucilaginous material of Irish moss. It further demonstrates that the alkali employed need not necessarily be a slightly water soluble one, such as calcium hydroxide, but may be highly soluble in water, as is the case with the alkali of this example. Moreover, it further demonstrates that alkali in the solid phase need not necessarily be present, since in this example the amount of sodium carbonate employed did not exceed the amount which was soluble in the amount of water present, and in fact it was observed in the course of this experiment that all of the sodium carbonate remained in solution. It is seemingly the case with respect to the alkali employed for the improvement of the gelling properties of the mucilaginous material of Irish moss that said alkali must be present in a sufficient excess or reserve amount, but that it is immaterial whether this excess be present in solution or as a solid phase.

It further appears from this example that while sodium carbonate is effective in improving gelling properties of the mucilaginous material of Irish moss, it is not as desirable for this purpose as certain other alkalies, notably calcium hydroxide. Not only is the amount of sodium carbonate required greatly in excess of the amount of calcium hydroxide required for the same degree of improvement in gelling properties, but also the employment of sodium carbonate in such excess results in a greater degree of depolymerization of the mucilaginous material than is suffered by the employment of calcium hydroxide.

This example serves further to demonstrate that a substantial improvement in the gelling properties of the mucilaginous material of Irish moss can be achieved even though the improved mucilaginous material is evidently extensively depolymerized by the process employed.

The failure of the mucilaginous material obtained in this example to yield an aqueous gel further demonstrates the dependence of the aqueous gelling phenomenon on the cations associated with the mucilaginous material. It is evident that the treatment of the precursive mucilaginous material with sodium carbonate in excess had also the effect of extensively replacing by sodium the calcium and other cations associated with the precursive material. Thus the mucilaginous material obtained in this example was substantially in the form of a sodium salt. It is well known that the sodium cation does not promote aqueous gel formation by the mucilaginous material of Irish moss, and it will be shown by this and subsequent examples that the improved mucilaginous material obtained by the practice of this invention likewise does not form an aqueous gel when the cation associated therewith is substantially sodium.

Moreover, for the foregoing reasons, the failure of the mucilaginous material obtained in this example to yield an aqueous gel does not imply that said material lacks the potential ability to form an aqueous gel in the presence of more suitable cations, such as calcium and/or potassium. Indeed, it does not imply that the aqueous gel-forming potential of said material has not in fact been improved over that of its precursor. The data of Example 1 have shown that where an improvement in milk reactivity has been effected by the practice of this invention, the thus improved mucilaginous material so obtained also has an improved potential ability to form aqueous gels.

*Example 4*

Portions of a filtered extract of Irish moss, said extract containing 1.81% mucilaginous material, were heated with various amounts of trisodium phosphate. The temperature was maintained at 126° C. for three hours. The products obtained thereby were filtered to remove tricalcium phosphate formed by the reaction of some of the trisodium phosphate with calcium present in the aforementioned Irish moss extract. The filtrates were neutralized with hydrochloric acid and the mucilaginous materials precipitated therefrom by the addition of isopropyl alcohol. After further dehydration with isopropyl alcohol the precipitated mucilaginous materials were dried at 65° C.

A specimen of the mucilaginous material precursive to the above preparations of this example was prepared by precipitating with isopropyl alcohol a portion of the original filtered extract of Irish moss, omitting both the trisodium phosphate and the three-hour heating period. The precipitate was further dehydrated with isopropyl alcohol and dried at 65° C.

Data on all of the preparations of this example are given in Table 5.

TABLE 5

| $Na_3PO_4$, percent of mucilaginous material | Treatment pH [1] | Milk reactivity [2] | Aqueous gel strength [3] | Viscosity [4] |
|---|---|---|---|---|
| ([5]) |  | 42.4 | 6.8 | 669 |
| 55 | 11.4 | 105.3 | ([6]) | 144 |
| 110 | 11.7 | 57.9 | ([6]) | 15 |

[1] As in example 1.
[2] As in example 1.
[3] As in example 1.
[4] As in example 1.
[5] Precursive material, not heated with alkali.
[6] Very weak gel.

This example again demonstrates the use of a highly soluble alkali to improve the gelling properties of the mucilaginous material of Irish moss. It further illustrates that while a relatively strong alkali, such as trisodium phosphate in the present example, is effective in producing the aforesaid improvement, it must be cautiously employed with respect to the amount used and the conditions of treatment in order to avoid excessive depolymerization of the mucilaginous material. As can be seen from Table 5, the employment of an excessive amount of trisodium phosphate depolymerized the mucilaginous material to the point where its milk reactivity was adversely affected.

*Example 5*

Portions of a filtered extract of Irish moss, said extract containing 1.89% mucilaginous material, were heated with various amounts of sodium metaborate. The temperature was maintained at 126° C. for three hours. The products obtained thereby were filtered and the filtrates neutralized with hydrochloric acid. The mucilaginous materials were precipitated from the filtrates by the addition of isopropyl alcohol. After further dehydration with isopropyl alcohol the precipitated mucilaginous materials were dried at 65° C.

A specimen of the mucilaginous material precursive to the above preparations of this example was prepared by precipitating with isopropyl alcohol a portion of the original filtered extract of Irish moss, omitting both the sodium metaborate and the three-hour heating period. The precipitate was further dehydrated with isopropyl alcohol and dried at 65° C.

Data on all of the preparations of this example are given in Table 6.

TABLE 6

| $NaBO_2$, percent of mucilaginous material | Treatment, pH [1] | Milk reactivity [2] | Aqueous gel strength [3] | Viscosity [4] | $SO_4$ [5] |
|---|---|---|---|---|---|
| ([6]) |  | 39.3 | 8.1 | 561 | 25.39 |
| 53 | 9.2 | 43.1 | Fluid | 275 | 25.40 |
| 106 | 9.6 | 50.3 | Fluid | 257 | 25.16 |

[1] As in Example 1.
[2] As in Example 1.
[3] As in Example 1.
[4] As in Example 1.
[5] Not corrected for moisture content of mucilaginous material.
[6] Precursive material, not heated with alkali.

In this example a very mild alkali was employed, and it is seen that at a high level of usage some improvement in the milk reactivity of the mucilaginous material was effected, but that this improvement was slight. This and the foregoing examples illustrate that seemingly any alkali is capable of effecting more or less of an improvement in the gelling properties to the mucilaginous material of Irish moss, but that for optimal results the alkali should be a mild one, such as calcium hydroxide, but not so mild as to afford too low a concentration of hydroxyl ions, as in the present example, nor yet so strong that alkaline hydrolysis can progress to the point of severe depolymerization. It is seemingly the case that the modification of the mucilaginous material of Irish moss so as to improve its gel-forming properties and according to the practice of this invention is optimally effected within a range of hydroxyl ion concentration corresponding to a pH range of 11 to 12. However, the pH may range from about 9.5, as indicated by this example, to about 13, while in ordinary practice the pH does not exceed about 12.5.

*Example 6*

Portions of a filtered extract of Irish moss, said extract containing 1.80% mucilaginous material, were heated with the following organic amines and quaternary ammonium hydroxides:

Triethanolamine
Tetraethanolammonium hydroxide
Tetraethylammonium hydroxide
Phenyltrimethylammonium hydroxide These compounds were employed at various concentrations and in each case the temperature was maintained at 126° C. for three hours. The products obtained thereby were clarified by filtration and the filtrates neutralized with hydrochloric acid. The mucilaginous materials were precipitated from the filtrates by the addition of isopropyl alcohol. After further dehydration with isopropyl alcohol the precipitated mucilaginous materials were dried at 65° C.

A specimen of the mucilaginous material precursive to the above preparations of this example was prepared by precipitating with isopropyl alcohol a portion of the original filtered extract of Irish moss, omitting both the organic reagent and the three-hour heating period. The precipitate was further dehydrated with isopropyl alcohol and dried at 65° C.

Data on all of the preparations of this example are given in Table 7.

TABLE 7

| Reagent | Amt. of reagent, percent of mucilaginous material | Treatment, pH [1] | Milk reactivity [2] | Aqueous gel strength [3] | Viscosity [4] | $SO_4$ [5] |
|---|---|---|---|---|---|---|
| ([6]) |  |  | 46.2 | Fluid | 498 | 25.84 |
| $(C_2H_4OH)_3N$ | 28 | 8.9 | 41.3 | Fluid | 139 | 25.73 |
| $(C_2H_4OH)_3N$ | 56 | 9.2 | 29.5 | Fluid | 51 |  |
| $(C_2H_4OH)_3N$ | 112 | 9.6 | 40.8 | Fluid | 154 | 24.64 |
| $(C_2H_4OH)_4NOH$ | 28 | 10.0 | 50.7 | Fluid | 278 | 27.07 |
| $(C_2H_4OH)_4NOH$ | 56 | 10.9 | 73.1 | Fluid | 281 | 25.70 |
| $(C_2H_4OH)_4NOH$ | 112 | 11.2 | 87.5 | Fluid | 364 | 25.27 |
| $(C_2H_5)_4NOH$ | 5.6 | 8.8 | 53.9 | Fluid | 341 | 28.33 |
| $(C_2H_5)_4NOH$ | 28 | 11.8 | 80.8 | Fluid | 359 | 26.05 |
| $(CH_3)_3C_6H_5NOH$ | 5.6 | 8.6 | 48.2 | Fluid | 376 | 28.48 |
| $(CH_3)_3C_6H_5NOH$ | 28 | 11.8 | 67.4 | Fluid | 422 | 26.39 |
| $(CH_3)_3C_6H_5NOH$ | 56 | 12.1 | 102.7 | Fluid | 336 | 25.40 |

[1] As in Example 1.
[2] As in Example 1.
[3] As in Example 1.
[4] As in Example 1.
[5] Not corrected for moisture content of mucilaginous material.
[6] Precursive material, not treated.

This example demonstrates that the alkali employed in the practice of this invention may be an organic one and further demonstrates that any alkali, inorganic or organic, may be thus employed, provided it is sufficiently strong to afford a sufficient concentration of hydroxyl ions. By here employing successively stronger organic alkalies, a progression is obtained from the feebly alkaline triethanolamine which is practically ineffective in improving the gel-forming properties of the mucilaginous material to the strongly alkaline unsubstituted tetraalkyl- or aryltrialkylammonium hydroxides. The latter, as is well known, approach in strength the alkali metal hydroxides, and it is here seen that they are thereby capable of effecting an improvement in the gel-forming properties of the mucilaginous material of the order attainable with calcium hydroxide. Being stronger than calcium hydroxide, they are effective at lower concentrations. Moreover, at such concentrations they exhibit a relatively slight tendency to depolymerize the mucilaginous material. In this respect they are in marked contrast to the strong alkali metal hydroxides, such as sodium hydroxide or potassium hydroxide, whose tendency to depolymerize the mucilaginous material is so severe as to render them disadvantageous for the practice of this invention. The relatively small quantities required of these strong organic alkalies and their relatively mild degradative effect on the mucilaginous material would render their use advantageous for the practice of this invention were it not for their present high cost which renders their employment economically prohibitive. A further disadvantage of these reagents would be the presence in the product of possibly toxic quaternary ammonium salts such as would render the improved mucilaginous material unfit for use in food products.

A further observation with regard to this example is that the improved mucilaginous materials show no decrease in sulfate content from that of the precursive material. Although improvement of the mucilaginous material of Irish moss by alkali treatment in accordance with the practice of this invention may be attended by more or less cleavage and removal of sulfate, the present example demonstrates that such removal of sulfate is not necessarily a concomitant of said improvement.

*Example 7*

Portions of a filtered extract of Irish moss, said extract containing 1.65% mucilaginous material, were heated with calcium hydroxide both alone and with the addition of sodium hydroxide. The heating was maintained at 126° C. for three hours. Each portion after heating was filtered to remove excess calcium hydroxide. The filtrates were neutralized with hydrochloric acid and the mucilaginous materials precipitated therefrom by the addition of isopropyl alcohol. After further dehydration with isopropyl alcohol the precipitated mucilaginous materials were dried at 65° C. The dried mucilaginous materials were tested for their milk reactivity, aqueous gel-forming power, and viscosity in aqueous solution.

A specimen of the mucilaginous material precursive to the above preparations of this example was prepared by precipitating with isopropyl alcohol a portion of the original filtered extract of Irish moss, omitting both the alkalies and the three-hour heating period. The precipitate was further dehydrated with isopropyl alcohol and dried at 65° C.

Data on all of the preparations of this example are given in Table 8.

TABLE 8

| $Ca(OH)_2$, percent of mucilaginous material | NaOH, percent of mucilaginous material | Treatment, pH [1] | Milk reactivity [2] | Aqueous gel strength [3] | Viscosity [4] | $SO_4$ [5] |
|---|---|---|---|---|---|---|
| [6] | | | 36.8 | Fluid | 561 | 24.53 |
| 61 | 0 | 12.1 | 134.8 | Tr. gel | 202 | 23.50 |
| 61 | 6.1 | 12.2 | 148.6 | Soft gel | 262 | 28.11 |
| 61 | 30.3 | 12.5 | 117.9 | Fluid | 71 | 29.41 |
| 61 | 61 | 12.8 | 36.1 | do | 20 | 27.17 |
| 121 | 0 | 12.2 | 158.3 | 22.1 | 277 | 28.98 |
| 121 | 6.1 | 12.3 | 150.5 | 12.7 | 324 | 27.74 |
| 121 | 30.3 | 12.5 | 111.3 | Fluid | 60 | 29.59 |
| 121 | 61 | 12.8 | 36.6 | do | 16 | 27.23 |

[1] As in Example 1.
[2] As in Example 1.
[3] As in Example 1.
[4] As in Example 1.
[5] Not corrected for moisture content of mucilaginous material.
[6] Precursive material, not treated.

This example demonstrates that the fortification of a mild alkali, such as calcium hydroxide, with a strong alkali, such as sodium hydroxide, is generally disadvantageous for the alkali treatment of the mucilaginous material of Irish moss. The tendency of the strong alkali to depolymerize the mucilaginous material more than offsets any enhancement it might afford to the action of the calcium hydroxide to improve the gel-forming properties of the mucilaginous material.

*Example 8*

A filtered extract of Irish moss, said extract containing 1.80% of mucilaginous material, was heated with an anion-exchange resin. Amberlite IRA–400, in the amount of 1110% of the weight of mucilaginous material in the solution. The temperature was maintained at 95° C. for ten hours. The solution had a pH value of 11.9 at the end of this heating period. The resin was then removed from the solution by decantation and filtration. The filtrate was neutralized by hydrochloric acid and the mucilaginous material precipitated therefrom by the addition of isopropyl alcohol. After further dehydration with isopropyl alcohol the precipitated mucilaginous material was dried at 65° C.

A specimen of the mucilaginous material precursive to the above preparation of this example was prepared by precipitating with isopropyl alcohol a portion of the original filtered extract of Irish moss, omitting both the anion-exchange resin and the ten-hour heating period. The precipitate was further dehydrated with isopropyl alcohol and dried at 65° C.

Data on the preparations of this example are given in Table 9.

TABLE 9

| Product | Milk reactivity [1] | Aqueous gel strength [2] | Viscosity [3] | $SO_4$ [4] |
|---|---|---|---|---|
| Precursive material | 45.5 | Fluid | 567 | 26.10 |
| Resin-treated material | 72.3 | Fluid | 393 | 24.68 |

[1] As in Example 1.
[2] As in Example 1.
[3] As in Example 1.
[4] Not corrected for moisture content of mucilaginous material.

This example further illustrates that any reagent capable of affording a sufficient concentration of hydroxyl ions will be effective in improving the gel-forming power of the mucilaginous material of Irish moss.

The employment of an anion-exchange resin as a source of hydroxyl ions, here cited as an extreme instance of the general principle involved in the practice of this invention, is not highly practical at the present time since anion-exchange resins in their present state of development are not highly stable to heat and suffer deterioration at the temperatures required in said practice of the invention. Were it not for this disability, the use of an anion-exchange resin might be attractive, since it might then be recovered and regenerated to be used repeatedly.

*Example 9*

Portions of a filtered extract of Irish moss, said extract containing 1.67% of mucilaginous material, were heated with various amounts of strontium hydroxide. The temperature was maintained at 126° C. for three hours. The products obtained thereby were filtered to remove strontium sulfate formed by hydrolytic cleavage of a portion of the monoester sulfate groups of the mucilaginous material, and the filtrates were neutralized with hydrochloric acid. The mucilaginous materials were precipitated from the filtrates by the addition of isopropyl alcohol. After further dehydration with isopropyl alcohol the precipitated mucilaginous materials were dried at 65° C.

A specimen of the mucilaginous material precursive to the above preparations of this example was prepared by precipitating with isopropyl alcohol a portion of the original filtered extract of Irish moss, omitting both the strontium hydroxide and the three-hour heating period. The precipitate was further dehydrated with isopropyl alcohol and dried at 65° C.

Data on all of the preparations of this example are given in Table 10.

TABLE 10

| $Sr(OH)_2$, percent of mucilaginous material | Treatment, pH [1] | Milk reactivity [2] | Aqueous gel strength [3] | Viscosity [4] | $SO_4$ [5] |
|---|---|---|---|---|---|
| (6) | | 41.0 | 11.1 | 283 | 25.77 |
| 13.7 | 10.3 | 73.1 | 25.4 | 186 | 22.97 |
| 27.4 | [7] 12.75 | 150.1 | 104.7 | 100 | 16.08 |

[1] As in Example 1.
[2] As in Example 1.
[3] As in Example 1.
[4] As in Example 1.
[5] Not corrected for moisture content of mucilaginous material.
[6] Precursive material, not heated with alkali.
[7] Approximate determination by "Hydrion" indicator paper.

The alkaline reagent employed in this example is one which is also effective in bringing about the hydrolytic cleavage of monoester sulfate from the molecule of mucilaginous material by removing said sulfate as the insoluble strontium sulfate. Although one would expect that a very extensive elimination of monoester sulfate groups from the mucilaginous material would be destructive of its gel-forming properties insofar as these depend on cross-linkage through said groups, it is seemingly the case that removal of a moderate proportion of these groups, as in this example, can be accomplished while the alkali also acts concomitantly to effect a very substantial improvement in the gel-forming properties of the resultant mucilaginous material even though it has been partially desulfated in the process.

*Example 10*

A quantity of commercial dried unbleached Irish moss was pulverized and blended to uniformity. Portions were macerated with 60° C. water to which had been added calcium hydroxide in the amount of 50% of the weight of dry, pulverized Irish moss taken. The macerations were completed by milling the resulting pulps in a Premier colloid mill to produce viscous pastes wherein the weight of dry, pulverized moss incorporated therein amounted to 3.6% of the final weight of paste. These pastes were then heated at various temperatures, with the period of heating in each case being six hours. Following the heating, each paste was mixed with a filter aid of the diatomaceous earth type and filtered by suction to produce a filtered extract of alkali-treated mucilaginous material. These extracts were neutralized with hydrochloric acid and the mucilaginous material then precipitated therefrom by the addition of isopropyl alcohol. The precipitates were further dehydrated with isopropyl alcohol and dried at 65° C. Data on these preparations are given in Table 11.

TABLE 11

| Temp. of treatment, °C. | Treatment, pH [1] | Yield [2] | Milk reactivity [3] | Aqueous gel strength [4] | Viscosity [5] | $SO_4$, percent [6] | Ca, percent [6] | Theo. percent Ca for Ca carrageenate [7] | Ca, percent of theo. |
|---|---|---|---|---|---|---|---|---|---|
| 95 | 12.1 | 43.4 | 76.2 | 33.4 | 118 | 22.93 | 3.26 | 4.76 | 68.5 |
| 115 | 12.1 | 43.8 | 114.7 | 50.0 | 212 | 22.95 | 4.32 | 4.77 | 90.5 |
| 126 | 12.1 | 44.1 | 139.6 | 57.5 | 124 | 23.20 | 4.88 | 4.83 | 99.0 |

[1] As in Example 1.
[2] Percent of Irish moss used.
[3] As in Example 1.
[4] As in Example 1.
[5] As in Example 1.
[6] Not corrected for moisture content of mucilaginous material.
[7] Calculated from $SO_4$ according to theoretical ratio of Ca: $2SO_4$ for a Ca galactose sulfate.

This example illustrates the application of my invention to the treatment of the whole seaweed so that the improvement of the gelling properties of the mucilaginous material therein is effected simultaneously with the digestion of the seaweed and extraction therefrom of the mucilaginous material in its improved form. It further confirms that alkali treatment at the higher temperatures within the range I have found to be optimal for the practice of this invention results in a greater degree of improvement in gelling properties of the mucilaginous material than is obtained at lower temperatures. Moreover the observation that the yield of mucilaginous material from Irish moss remains substantially the same as the different temperatures of treatment and regardless of the degree of improvement in gelling properties effected on the mucilaginous material confirms that said improvement represents a fundamental change in the nature of the mucilaginous material and is not due merely to extraction of other, more strongly-gelling constituents of the Irish moss, as might be the case if an increase in yield were found for the more highly improved mucilaginous material. Nor can said improvement be due to the degradation and elimination of weakly-gelling components of the Irish moss to leave as recoverable only a strongly-gelling component, as might be the case if a decrease in yield were found for the more highly improved mucilaginous material.

*Example 11*

Portions of a filtered extract of Irish moss were heated with calcium hydroxide in the amount of about 120% of the weight of mucilaginous material in the portion taken. The heating was maintained for six hours at various temperatures as shown in Table 12. Each portion after heating was filtered to remove excess calcium hydroxide. Each filtrate was then passed, in accordance with known techniques, through a column containing a cation-exchange resin, Amberlite IR–120, in the sodium form. The purpose of this operation was to convert the mucilaginous material in the filtrate into its sodium salt. Said sodium salt of each mucilaginous material was precipitated from the effluent solution from the ion-exchange column by the addition of isopropyl alcohol. After further dehydration with isopropyl alcohol the precipitated sodium salt of each mucilaginous material was dried at 65° C.

Another portion from the same lot of filtered extract of Irish moss was passed directly through a cation-exchange column as in the foregoing procedure but with omission of the prior heating with the calcium hydroxide. The effluent solution was precipitated with isopropyl alcohol, further dehydrated with isopropyl alcohol, and dried at 65° C. to yield the sodium salt of the mucilaginous material precursive to the above preparations of this example.

Data on all of the preparations of this example are given in Table 12.

TABLE 12

| Temperature of alkali treatment, ° C. | Treatment, pH [1] | Milk reactivity [2] | Viscosity [3] | Ca, percent [4] | $SO_4$, percent [4] |
|---|---|---|---|---|---|
| Not treated | | 61.9 | 1022 | 0.01 | 29.10 |
| 99 | 12.3 | 126.8 | 385 | 0.01 | 29.25 |
| 115 | 12.1 | 180.1 | 385 | 0.01 | 29.00 |
| 126 | 12.2 | 219.7 | 185 | 0.01 | 27.84 |

[1] As in Example 1.
[2] As in Example 1.
[3] As in Example 1.
[4] Percent of moisture-free product.

In this example the precursive mucilaginous material was of high quality with respect to milk reactivity and degree of polymerization. This is reflected in the extremely high degree of milk reactivity attained upon its improvement in accordance with the practice of my invention. Moreover, this example illustrates that the mucilaginous material retains the property of milk reactivity when it is in the form of a salt, such as the sodium salt, which is known not to form a gel with water.

Furthermore, this example shows that treatment of the mucilaginous material, in accordance with the practice of my invention, with an alkali, such as calcium hydroxide, which does not form a highly insoluble sulfate, does not eliminate sulfate from the mucilaginous material through hydrolytic cleavage, unless the treatment be carried out at a relatively high temperature, in which case a small amount of sulfate is found to be thus eliminated. It provides a further illustration that the improvement in gelling properties of the mucilaginous material is not necessarily attended by elimination of sulfate therefrom.

*Example 12*

A neutral solution containing about 1.6% of alkali-modified calcium carrageenate, which had been produced by treatment of Irish moss in accordance with the practice of this invention, was coagulated by the addition of isopropyl alcohol containing potassium chloride in the amount of 70% of the weight of calcium carrageenate present in the solution. This potassium salt acted on the coagulum of calcium carrageenate to effect an ion exchange whereby a portion of the calcium of the calcium carrageenate was replaced by potassium. The resulting coagulum was then pressed into a moist cake containing 13% of dry solids. Portions of this cake were further treated with an aqueous solution containing 50% by weight of isopropyl alcohol and various percentages by weight of potassium chloride, as shown in Table 13. The ratio taken of this solution to the moist cake was 5:1 by weight; the temperature and duration of the treatment were 20° C. and 30 minutes, respectively. The excess solution was separated from the cake by draining and pressing, and the cake was dried at 65° C. The resulting products consisted essentially of potassium calcium salts of the alkali-modified carrageenan with the ratio of potassium to calcium therein being greater for those which had been treated with larger amounts of potassium chloride.

Data on all of the preparations of this example are given in Table 13.

TABLE 13

| KCl percent in 50% isopropyl alcohol treatment solution | Excess KCl retained in product [1] | Aqueous gel strength [3] | Milk reactivity [2] |
|---|---|---|---|
| 0 | 0.21 | 131.5 | 103.0 |
| 1 | 0.39 | 269.9 | 95.0 |
| 2 | 0.89 | 357.1 | 81.3 |
| 3 | 1.88 | 358.2 | 78.8 |
| 4 | 6.20 | 290.6 | 76.2 |
| 5 | 8.94 | 287.8 | 67.8 |

[1] Percent of product.
[2] As in Example 1.
[3] As in Example 1.

This example illustrates the degree of aqueous gelling ability attainable with carrageenates which have been subjected to alkali treatment in accordance with the practice of my invention when the potential aqueous gel-forming ability induced thereby is activated by association of the alkali-modified carrageenate with the proper cations. It is further evident that the gelling effect observed in this example arises through introduction of potassium as a counter ion to the alkali-modified carrageenate anion and not to any desolubilizing or "salting-out" effect due to the presence in the product of excess potassium chloride. In fact, it is seen that the presence of potassium chloride in substantial excess has a deleterious effect on the aqueous gel-forming ability of the product.

*Example 13*

Portions were taken from a well-mixed lot of dried seaweed of the Eucheuma species which is harvested on the southeast coast of Africa and known to the trade by such names as Zanzibar weed, thick type Gracilaria, and *Eucheuma cottonii*. These portions were macerated with 60° C. water to which had been added various amounts of calcium hydroxide. The macerations were completed by milling the resulting pulps in a Premier colloid mill to produce pastes wherein the weight of seaweed incorporated amounted to 3.4% of the final weight of paste. Each paste was divided into three portions, each of which was heated for three hours at 98° C., 115° C. and 126° C., respectively. Following the heating, each portion of paste was mixed with a filter aid of the diatomaceous earth type and filtered by suction to produce a filtered extract of alkali-treated seaweed mucilage. These extracts were neutralized with hydrochloric acid and the mucilaginous material precipitated therefrom by the addition of isopropyl alcohol. The precipitates were further dehydrated with isopropyl alcohol and dried at 65° C. Data on these preparations are given in Table 14.

TABLE 14

| Ca(OH)$_2$, percent of seaweed [1] | Temp. of treatment, °C. | Treatment, pH [2] | Yield [3] | Milk reactivity [4] | Aqueous gel strength [5] | Viscosity [6] | SO$_4$, percent [7] | Ca, percent [7] | Ca, percent of theo. [8] |
|---|---|---|---|---|---|---|---|---|---|
| 0 | 98 | 7.9 | 44.7 | 24.2 | 34.7 | 278 | 25.28 | 0.37 | 7.2 |
| 0 | 115 | 8.1 | 44.3 | 22.6 | 27.9 | 162 | 25.09 | 0.39 | 7.7 |
| 0 | 126 | 8.2 | 44.5 | 22.0 | 22.2 | 56 | 25.49 | 0.45 | 8.7 |
| 1.3 | 98 | 8.9 | 45.3 | 23.1 | 39.5 | 98 | 26.80 | 1.54 | 27.4 |
| 1.3 | 115 | 8.8 | 44.2 | 24.5 | 37.7 | 85 | 27.66 | 1.57 | 27.4 |
| 1.3 | 126 | 8.9 | 46.3 | 22.1 | 36.1 | 62 | 27.04 | 1.55 | 27.4 |
| 2.6 | 98 | 10.6 | 43.9 | 34.9 | 104.8 | 246 | 26.98 | 1.96 | 35.1 |
| 2.6 | 115 | 10.1 | 44.9 | 35.1 | 103.7 | 212 | 26.88 | 2.00 | 35.6 |
| 2.6 | 126 | 9.5 | 46.1 | 33.6 | 91.9 | 153 | 27.10 | 2.02 | 35.6 |
| 6.6 | 98 | 11.8 | 42.3 | 90.1 | 239.6 | 333 | 26.12 | 3.38 | 62.0 |
| 6.6 | 115 | 11.8 | 39.7 | 164.6 | 395.7 | 367 | 25.83 | 3.58 | 68.3 |
| 6.6 | 126 | 11.9 | 42.3 | 192.6 | 570.2 | 431 | 26.01 | 3.43 | 63.5 |
| 13.2 | 98 | 12.3 | 42.9 | 162.0 | 431.8 | 293 | 26.30 | 4.43 | 80.8 |
| 13.2 | 115 | 12.3 | 43.3 | 203.6 | 551.6 | 276 | 26.46 | 4.32 | 78.4 |
| 13.2 | 126 | 12.2 | 41.0 | 211.4 | 645.7 | 333 | 26.59 | 4.32 | 78.4 |
| 19.8 | 98 | 12.3 | 43.7 | 181.6 | 443.8 | 287 | 26.00 | 4.20 | 77.9 |
| 19.8 | 115 | 12.2 | 44.8 | 208.1 | 573.4 | 316 | 26.48 | 4.04 | 73.1 |
| 19.8 | 126 | 12.2 | 42.3 | 210.0 | 618.6 | 431 | 26.85 | 4.20 | 75.0 |
| 26.4 | 98 | 12.0 | 41.6 | 164.3 | 398.5 | 465 | 25.73 | 4.28 | 79.9 |
| 26.4 | 115 | 11.9 | 41.4 | 217.0 | 516.6 | 373 | 25.72 | 4.10 | 77.0 |
| 26.4 | 126 | 11.7 | 40.9 | 241.0 | 641.7 | 402 | 26.11 | 4.11 | 76.0 |
| 52.9 | 98 | 12.3 | 40.1 | 155.2 | 395.3 | 333 | 26.70 | 4.12 | 74.0 |
| 52.9 | 115 | 12.3 | 39.8 | 160.5 | 537.3 | 499 | 26.67 | 4.06 | 73.1 |
| 52.9 | 126 | 12.2 | 40.2 | 200.1 | 630.1 | 436 | 27.39 | 4.16 | 72.1 |

[1] Based on dried seaweed containing 19% moisture.
[2] As in Example 1.
[3] Percent of moisture-free product based on moisture-free seaweed.
[4] As in Example 1.
[5] As in Example 1.
[6] As in Example 1.
[7] Based on moisture-free product.
[8] Observed ratio of Ca to SO$_4$ calculated as percent of theoretical ratio Ca: 2SO$_4$=0.208 for a Ca hexose sulfate This example illustrates the unusually high capability of the mucilaginous material of Zanzibar weed for improvement of its gelling properties in accordance with the practice of my invention. As much as a tenfold increase in milk reactivity and a twenty-fold increase in aqueous gel strength are seen to be attainable thereby. This unusual susceptibility of the Zanzibar weed mucilage to the type of alkaline hydrolysis which is the subject of my invention is further shown by its response to treatment by lower concentrations of alkali than have been found to be effective for the modification of the carrageenan of Irish moss.

Moreover, I have found, and illustrated in this example, that modification of the naturally-occurring mucilage of Zanzibar weed, in accordance with certain ways of practicing my invention, affords directly a mucilaginous material capable of forming extremely strong gels with water, no further treatment of said mucilaginous material to associate more potassium ions therewith being required. In fact, it is found that the addition of more potassium ions thereto produces no further enhancement of aqueous gel strength. While potassium ions appear to be involved in the usual formation of aqueous gels by the naturally-occurring mucilage of Zanzibar weed as well as by said mucilage after improvement according to the practice of this invention, it is seemingly the case that said mucilage contains an amount of potassium which is optimal for aqueous gel formation within the limits imposed by the structure of the naturally-occurring polysaccharide. It further appears that said polysaccharide structure is one which tenaciously retains potassium ions. Modification of the polysaccharide structure by alkaline hydrolysis in accordance with the practice of this invention improves its potential ability to form aqueous gels, and when this invention is practiced in certain ways, as illustrated by this example, the improved mucilaginous material still retains an optimal amount of potassium and hence aqueous gels prepared therefrom are not further improved by the addition of more potassium ions.

Further evidence for this surmise is found in this example wherein it is found that only about 80% of the monoester sulfate groups of the mucilaginous material combine with calcium in the course of the treatment with calcium hydroxide. Presumably the remaining monoester sulfate groups remain in combination with potassium and other cations present in the precursive mucilaginous material.

By way of contrast to this behavior, one can cite the carrageenan of Irish moss which, as it naturally occurs, appears to contain less than an optimal amount of potassium, so that fortification of carrageenan, either as it naturally occurs or as it is improved by the practice of this invention, with potassium ions enhances its aqueous gel-forming ability to the maximum permitted by its polysaccharide structure. For carrageenan as it naturally occurs this maximum appears to be about the same as that for the naturally-occurring mucilage of Zanzibar weed. The maximum which I have been able to attain with alkali-modified carrageenan, however, is less than I have achieved with the alkali-modified mucilage of Zanzibar weed.

Examination of the yeld data of Table 14 indicates that the improvement in gelling properties of Zanzibar weed mucilage cannot be due to extraction from the weed of additional, strongly-gelling components already present therein, nor to destruction of feebly-gelling components therein. Thus the improvement of the gelling properties of the mucilaginous material of Zanzibar weed, in accordance with the practice of this invention, appears to be due to chemical changes in the mucilaginous material and not to extraction of different substances from the weed. In this respect, the result I have obtained with the mucilaginous material of Zanzibar weed is similar to that with the carrageenan of Irish moss.

The data of this example further show that the chemical changes which take place on alkaline hydrolysis of the polysaccharide of Zanzibar weed, in accordance with the practice of this invention, do not necessarily result in the elimination of monoester sulfate groups from said polysaccharide. Here again the behavior of Zanzibar weed polysaccharide is similar to that of carrageenan.

The polysaccharide of Zanzibar weed has not been subjected to extensive investigation of the sort which has been devoted to carrageenan. Hence little is known of its structure. My investigations show that it closely resembles kappa-carrageenan in its content of 3,6-anhydro-galactose residues and monoester sulfate groups, and in its infrared absorption spectrum. None of these characteristics change significantly on alkaline hydrolysis. This absence of readily detectable chemical distinctions among kappa-carrageenan and the natural and alkali-modified Zanzibar weed polysaccharides offers no clue as to why Zanzibar weed polysaccharide should exhibit spectacular changes in its gelling properties on alkaline hydrolysis while kappa-carrageenan does not. Nor does it afford any insight into whatever chemical changes alkaline hydrolysis effects on Zanzibar weed polysaccharide. One may conjecture that alkaline hydrolysis as applied to this polysaccharide produces rearrangement of monoester sulfate groups therein in a manner similar to that postulated hereinabove from carrageenan, but without extensive formation of 3,6-anhydro rings or alterations in glycosidic linkages.

Example 14

A neutralized filtrate of alkali-modified mucilage of Zanzibar weed which had been prepared by treatment of the weed with 13% of its weight of calcium hydroxide at 98° C., in the manner described in Example 13, was divided into two portions. One portion was precipitated with isopropyl alcohol and the precipitate further dehydrated with isopropyl alcohol and dried at 65° C. to yield the potassium calcium salt of the alkali-modified mucilage of Zanzibar weed. The other portion was subjected to cation exchange with the sodium form of Amberlite IR-120 resin as in Example 11, and the ion-exchanged solution precipitated with isopropyl alcohol. The precipitate was further dehydrated with isopropyl alcohol and dried at 65° C. to yield the sodium salt of the alkali-modified mucilage of Zanzibar weed.

A neutralized filtrate of a more extensively alkali-modified mucilage of Zanzibar weed which had been prepared by treatment of the weed with 13% of its weight of calcium hydroxide at 126° C. in the manner described in Example 13, was divided into two portions. These portions were then worked up as in the foregoing procedures of the present example to yield, respectively, the potassium calcium salt and the sodium salt of a Zanzibar weed mucilage which had been subjected to more extensive alkaline hydrolysis than had the foregoing one of this example.

Data on the preparations of this example are given in Table 15.

TABLE 15

| Temp. of Ca(OH)₂ treatment, ° C. | Salt of mucilaginous material | Milk reactivity [1] | Aqueous gel strength [2] | SO₄, percent [3] | Ca, percent [3] | Ca, percent of theo. [4] |
|---|---|---|---|---|---|---|
| 98 | K Ca | 161.8 | 388.4 | 26.13 | 3.92 | 72.1 |
| 98 | Na | 161.6 | (⁵) | 26.60 | <0.01 | 0 |
| 126 | K Ca | 209.4 | 615.4 | 26.29 | 3.88 | 70.9 |
| 126 | Na | 198.6 | (⁵) | 26.59 | <0.01 | 0 |

[1] As in Example 1.
[2] As in Example 1.
[3] Percent of moisture-free product.
[4] Observed ratio of Ca to SO₄, calculated as percent of theoretical ratio Ca:2SO₄=0.208 for a Ca hexose sulfate.
[5] Completely fluid.

This example establishes that the milk reactivity of the alkali-modified mucilage of Zanzibar weed is virtually independent of the cations associated with said mucilage. It further establishes that the ability of said mucilage to form aqueous gels depends on the cations associated therewith and is completely suppressed when the cation so associated is one, such as sodium, which is not conducive to aqueous gel formation by seaweed mucilages of the types whose improvement is an object of this invention. It is seen that the behavior of Zanzibar weed mucilage is similar to carrageenan in these respects.

Example 15

Portions were taken from a well mixed lot of dried *Gigartina radula* and macerated with 60° C. water to which had been added various amounts of calcium hydroxide. The macerations were completed by milling the resulting pulps in a Premier colloid mill to produce pastes wherein the weight of *Gigartina radula* incorporated amounted to about 3% of the weight of paste. Each paste was then heated for three hours at 98° C. Following the heating, each paste was mixed with a filter aid of the diatomaceous earth type and filtered by suction to produce a filtered extract of alkali-treated mucilage of *Gigartina radula*. These extracts were neutralized with hydrochloric acid and the mucilaginous material precipitated therefrom by the addition of isopropyl alcohol. The precipitates were further dehydrated with isopropyl alcohol and dried at 65° C. Data on these preparations are given in Table 16.

TABLE 16

| Ca(OH)₂, percent of *Gigartina radula* [1] | Milk reactivity [2] | Viscosity [3] | Ca, percent [4] |
|---|---|---|---|
| 0 | (⁵) | 333 | 0.81 |
| 2.6 | (⁵) | 442 | 2.53 |
| 6.6 | 34.9 | 727 | 4.62 |
| 13.2 | 36.0 | 671 | 5.79 |
| 26.4 | 53.1 | 689 | 8.66 |

[1] Based on commercial dried *Gigartina radula* containing about 30% moisture.
[2] As in Example 1.
[3] As in Example 1.
[4] Percent of moisture-free product.

This example demonstrates that alkaline hydrolysis, according to the practice of this invention, is also applicable to the mucilage of *Gigartina radula*, although it appears that this mucilage is less susceptible to improvement of its gel-forming properties thereby than is the carrageenan of Irish moss or the mucilage of the Eucheuma species hereinabove referred to as Zanzibar weed.

As a concomitant of the increase in milk reactivity obtained by the practice of this invention the improved mucilaginous material also has an increased ability to suspend cocoa in milk. The amount of mucilaginous material required to suspend a given amount of cocoa in milk is inversely related to the milk reactivity of said material, and by employing mucilaginous materials improved according to the practice of this invention said suspension of cocoa can be accomplished with 90% or less of the amount which would be required of the precursive, unimproved material.

It is apparent from the foregoing that the present invention permits the production from a certain class of seaweeds, as hereinabove defined, of mucilaginous materials of an improved nature which are novel and useful products in that they possess several-fold greater gelling ability for both water and milk than do the mucilaginous materials precursive to said improved mucilaginous materials, as said precursive materials ordinarily occur in the aforesaid seaweeds and as they are extracted therefrom by prior known methods. Moreover, these improved mucilaginous materials may be produced by simple and inexpensive methods of such a nature as can be combined with and simultaneously carried out during processes for the extraction and recovery of the mucilaginous materials from the aforesaid seaweeds. Moreover, the aforesaid improved mucilaginous materials, by extending by several fold the range of water and milk-gelling abilities hitherto obtainable in mucilaginous materials extracted from seaweeds, extend the usefulness and scope of application of mucilaginous materials extracted from seaweeds.

I claim:
1. A process for the treatment of a polysaccharide of seaweeds of the Gigartinaceae and Solieriaceae families containing ester sulfate groups within the range of about 5% to about 13% sulfur, which comprises heating the polysaccharide at a temperature of from about 80° C. to about 150° C. in an aqueous medium containing calcium hydroxide in an amount that is over 10% of the weight of the polysaccharide.

2. A process according to claim 1 wherein said polysaccharide is contained in seaweed and said treatment is carried out during extraction of the polysaccharide from said seaweed.

3. A process according to claim 2 wherein said heating treatment of the polysaccharide is carried out for about three hours to about six hours while the alkaline solution containing extracted polysaccharide remains unseparated from the seaweed, separating said solution while it is within said temperature range and at an alkaline pH from insoluble materials, and thereafter neutralizing the separated solution.

4. A process according to claim 1 which comprises heating the polysaccharide at a pH between about 11 and about 12.5 for a period of about three to six hours.

5. A process according to claim 1 wherein the amount of calcium hydroxide is at least about 50% by dry weight of the polysaccharide.

6. A process for the treatment of sulfated polysaccharide of seaweeds of the Gigartinaceae and Solieriaceae families, which comprises subjecting said polysaccharide to substantial alkaline hydrolysis in an aqueous medium containing alkaline material consisting substantially entirely of alkaline material selected from the group consisting of the hydroxides of calcium, of barium and of strontium, sodium carbonate, trisodium phosphate and sodium metaborate at a sustained pH between about 9.5 and about 13 and at a temperature of from about 80° C. to about 150° C., said alkaline material being substantially in excess of the amount thereof consumed during said alkaline hydrolysis and the total amount of said alkaline material being at least 10% of the dry weight of said polysaccharide.

7. A process according to claim 6 wherein said hydrolysis is effected until the content of anhydrosugar residues is increased in an amount at least 10% greater that that of the precursive polysaccharide.

8. A process according to claim 6 wherein said excess is provided by at least one of said hydroxides which is undissolved in said medium.

9. A process according to claim 6 wherein said temperature of from about 80° C. to about 150° C. is maintained for a period of about three to six hours.

10. A process for the treatment of a polysaccharide of seaweeds of the Gigartinaceae and Solieriaceae families, said polysaccharide containing ester sulfate groups within the range of about 5% sulfur to about 13% sulfur which comprises subjecting the polysaccharide to alkaline hydrolysis in an aqueous medium at a pH between about 9.5 and about 13 at a temperature between about 80° C. and about 150° C., said aqueous medium containing a compound selected from the group consisting of barium hydroxide and strontium hydroxide which is reactive with said ester sulfate group to form a sulfate which is insoluble in said aqueous medium.

11. A process for the treatment of a polysaccharide of seaweeds of the Gigartinaceae and Solieriaceae families, said polysaccharide containing ester sulfate groups within the range of about 5% to about 13% sulfur, which process comprises subjecting the polysaccharide to alkaline hydrolysis in an aqueous medium at a pH between about 9.5 and about 13 at a temperature between about 80° C. and about 150° C., said aqueous medium containing cations selected from the group consisting of barium and strontium which are reactive with said ester sulfate group to form sulfates insoluble in said aqueous medium.

12. A polysaccharide obtained by the process of claim 1 from a precursive polysaccharide of the Eucheuma species of seaweed known as *Eucheuma cottonii*, Zanzibar weed and thick type Gracilaria.

References Cited in the file of this patent
UNITED STATES PATENTS

| | | |
|---|---|---|
| 2,382,286 | Blihovde | Aug. 14, 1945 |
| 2,427,594 | Frieden | Sept. 16, 1947 |
| 2,439,964 | Byrne | Apr. 20, 1948 |
| 2,556,282 | Le Gloahec | June 12, 1951 |
| 2,593,528 | McCormack | Apr. 22, 1952 |
| 2,599,771 | Moe | June 10, 1952 |
| 2,620,335 | Nielsen et al. | Dec. 2, 1952 |
| 2,624,727 | Le Gloahec | Jan. 6, 1953 |
| 2,669,519 | Baker | Feb. 16, 1954 |
| 2,719,179 | Mora et al. | Sept. 27, 1955 |
| 2,801,923 | Stoloff | Aug. 6, 1957 |
| 2,864,706 | Stoloff | Dec. 16, 1958 |

UNITED STATES PATENT OFFICE
CERTIFICATE OF CORRECTION

Patent No. 3,094,517                                 June 18, 1963

Norman F. Stanley

It is hereby certified that error appears in the above numbered patent requiring correction and that the said Letters Patent should read as corrected below.

Column 1, line 64, for "which" read -- while --; column 2, line 21, for "whatsovere" read -- whatsoever --; line 60, for "fuctionality" read -- functionality --; column 10, line 3, for "Formula" read -- FIGURE --; line 70, for "larbda-carrageenan" read -- lambda-carrageenan --; column 11, line 62, for "an" read -- on --; column 15, line 54, strike out "over"; column 22, line 43, for "apH" read -- a pH --; line 46, for "tcid" read -- acid --; column 24, line 57, for "as" read -- at --; column 28, line 55, for "yeld" read -- yield --; column 30, add the following footnote to TABLE 16:

[5] Completely fluid.

Signed and sealed this 12th day of May 1964.

(SEAL)
Attest:

ERNEST W. SWIDER
Attesting Officer

EDWARD J. BRENNER
Commissioner of Patents